US010841648B2

(12) United States Patent
Sreekanth et al.

(10) Patent No.: US 10,841,648 B2
(45) Date of Patent: Nov. 17, 2020

(54) SYSTEMS AND METHODS FOR CONTROLLING ACCESS TO MEDIA ASSETS USING TWO-FACTOR AUTHENTICATION

(71) Applicant: Rovi Guides, Inc., San Jose, CA (US)

(72) Inventors: Harshith Kumar Gejjegondanahally Sreekanth, Shivamogga (IN); Ashwini Dharwa, Ratlam (IN); Sourabh Kumar, District Begusarai (IN); Sukanya Agarwal, Panchkula (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/693,120

(22) Filed: Nov. 22, 2019

(65) Prior Publication Data

US 2020/0092606 A1 Mar. 19, 2020

Related U.S. Application Data

(63) Continuation of application No. 16/066,243, filed as application No. PCT/US2016/061756 on Nov. 14, 2016, now Pat. No. 10,524,003.

(Continued)

(51) Int. Cl.

| | |
|---|---|
| ***H04N 21/4415*** | (2011.01) |
| ***G06F 21/62*** | (2013.01) |
| ***H04N 21/475*** | (2011.01) |
| ***H04N 21/441*** | (2011.01) |
| ***H04N 21/4227*** | (2011.01) |
| ***G06F 21/12*** | (2013.01) |

(Continued)

(52) U.S. Cl.

CPC ....... *H04N 21/4415* (2013.01); *G06F 21/121* (2013.01); *G06F 21/62* (2013.01);

(Continued)

(58) Field of Classification Search

CPC ........... H04N 21/4415; H04N 21/4532; H04N 21/4751; H04N 21/482; H04N 21/4227;

(Continued)

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |

(Continued)

FOREIGN PATENT DOCUMENTS

| | | |
|---|---|---|
| EP | 1 186 172 | 12/2000 |
| EP | 2 315 438 | 4/2011 |

OTHER PUBLICATIONS

International Search Report and Written Opinion of PCT/US2016/061756 dated Jul. 26, 2017.

(Continued)

*Primary Examiner* — Alexander Gee
(74) *Attorney, Agent, or Firm* — Haley Guiliano LLP

(57) ABSTRACT

Systems and methods for authorizing operations associated with blocked media assets using two-factor authentication. In some aspects, a media guidance application (e.g., executed by a set-top box or other user equipment used to store and display media assets) prompts a user for a password (e.g., a personal information number) in order to unlock the content for viewing. In response to receiving a second request from the user to perform an operation related to the media asset (e.g., delete), the media guidance application prompts the user for an additional factor confirming his or her identity, consistent with two-factor authentication protocol. If the user's identity is authenticated as a user that has authority to perform the operation related to the media asset (e.g., delete the stored media asset), the media guidance application performs the operation related to the media asset (e.g., deletes the media asset).

20 Claims, 12 Drawing Sheets

100

106
102
To Delete "Game of Thrones: Episode 2" please enter an authorization code
110
104
108
112

Related U.S. Application Data

(60) Provisional application No. 62/412,144, filed on Oct. 24, 2016.

(51) Int. Cl.
*H04L 29/06* (2006.01)
*H04N 21/45* (2011.01)
*H04N 21/482* (2011.01)

(52) U.S. Cl.
CPC ....... *H04L 63/102* (2013.01); *H04N 21/4227* (2013.01); *H04N 21/441* (2013.01); *H04N 21/4532* (2013.01); *H04N 21/4751* (2013.01); *H04N 21/4753* (2013.01); *H04N 21/482* (2013.01); *G06F 2221/2149* (2013.01); *H04L 2463/082* (2013.01)

(58) Field of Classification Search
CPC ........................ H04N 21/441; H04N 21/4753; G06F 21/121; G06F 21/62; G06F 2221/2149; H04L 63/102; H04L 2463/082
See application file for complete search history.

(56) References Cited

U.S. PATENT DOCUMENTS

| | | | | |
|---|---|---|---|---|
| 7,165,098 | B1 | 1/2007 | Boyer et al. | |
| 7,761,892 | B2 | 7/2010 | Ellis et al. | |
| 8,046,801 | B2 | 10/2011 | Ellis et al. | |
| 8,898,746 | B2 * | 11/2014 | Gregg | H04L 63/0853 726/4 |
| 2002/0174430 | A1 | 11/2002 | Ellis et al. | |
| 2003/0002862 | A1 | 1/2003 | Rodriguez et al. | |
| 2005/0251827 | A1 | 11/2005 | Ellis et al. | |
| 2007/0043846 | A1 * | 2/2007 | Grayson | H04L 51/22 709/223 |
| 2007/0094715 | A1 * | 4/2007 | Brown | G06F 21/34 726/5 |
| 2007/0300080 | A1 * | 12/2007 | Brown | H04L 9/0825 713/193 |
| 2008/0162925 | A1 * | 7/2008 | Okaya | H04N 21/4751 713/155 |
| 2010/0153885 | A1 | 6/2010 | Yates | |
| 2012/0011567 | A1 * | 1/2012 | Cronk | H04L 63/102 726/4 |
| 2012/0230649 | A1 | 9/2012 | Craner et al. | |
| 2012/0324552 | A1 * | 12/2012 | Padala | H04L 9/3213 726/6 |
| 2017/0041296 | A1 * | 2/2017 | Ford | H04W 12/06 |
| 2017/0064384 | A1 | 3/2017 | Sahoo et al. | |

OTHER PUBLICATIONS

IPEA Second Written Opinion of PCT/US2016/061756 dated Sep. 20, 2018.

* cited by examiner

200

| Identifier | Blocking Criteria | 2nd Factor | Alt. 2nd Factor | • • • |
|---|---|---|---|---|
| 1234 | TV-PG | Token | Biometric | |
| 6079 | TV-MA | Biometric | N/A | |
| • • • | | | | |

202 204 206 208 210

250

| Total Runtime | Rating | 2nd Factor to Delete | 2nd Factor to Copy | 2nd Factor to Update Viewing Progress | • • • |
|---|---|---|---|---|---|
| 61 Minutes | TV-MA | T | F | F | |

SYSTEMS AND METHODS FOR CONTROLLING ACCESS TO MEDIA ASSETS USING TWO-FACTOR AUTHENTICATION

CROSS-REFERENCE TO RELATED APPLICATIONS

This application is a continuation application of U.S. patent application Ser. No. 16/066,243, filed Jun. 26, 2018, which is a national stage application under 35 U.S.C. § 371 of International Application PCT/US2016/061756, filed Nov. 14, 2016, which claims benefit of and priority from U.S. Provisional Application 62/412,144, filed Oct. 24, 2016. The foregoing applications are incorporated herein by reference in their entireties.

BACKGROUND

Given the plethora of content available to modern television viewers, parental control systems have become near ubiquitous in electronic program guides (EPGs), which allow users to filter content for viewing. For example, parental control systems give parents the ability to decide what their children can watch when they are not around. Typically, a parental control system will have an access code that can be input to block and unblock content. A child attempting to access a blocked program and unaware of the access code will not be able to view the program. However, with this binary approach (access/no access based on a single code), multiple users in a household may have access to a media asset and may perform actions (e.g., deleting the media asset) that the other users do not want performed as there is no way to differentiate the identity of the user performing the action.

Some conventional systems attempt to solve this problem by using a user-profile system where users enter different codes to identify which specific user he or she is. However, this approach, using user-specific codes, while stronger than a single code to block and unblock media assets, still has the same problem in terms of validating user identity. For example, if a parent gives a child his or her code in order for the child to access a blocked media asset once, the child could conceivably remember the code and perform any of the actions the parent could at any time, defeating the purpose of having user-specific codes.

SUMMARY

Accordingly, systems and methods are described herein for authorizing operations associated with blocked media assets using two-factor authentication. For example, a media guidance application (e.g., executed by a set-top box or other user equipment used to store and display media assets) prompts a user for a password (e.g., a personal identification number ("PIN")) in order to unlock content for viewing. In response to receiving a second request from the user to perform an operation related to the media asset (e.g., delete), the media guidance application prompts the user for an additional factor confirming his or her identity, consistent with the two-factor authentication protocol described herein. If the user's identity is authenticated as a user that has authority to perform the operation related to the media asset (e.g., delete the stored media asset), the media guidance application performs the operation related to the media asset (e.g., deletes the media asset).

In some aspects, the media guidance application receives a first request to access a media asset for viewing on user equipment, wherein access to the media asset is blocked. For example, the media guidance application may store a plurality of media assets in storage, either local to the user device that generates media assets for display (e.g., in memory of a set-top box) or remotely at a server. The media guidance application may generate a listing of media assets (e.g., in a user interface) from which the user can select a media asset to be generated for display. The media guidance application may set a flag, based on metadata associated with each stored media asset, indicating whether each media asset should be blocked for a given user. As a specific example, the media guidance application may set the flag based on metadata associated with the media asset indicating that it fulfills a predefined blocking criterion (e.g., that a particular user cannot watch shows with a rating greater than TV-PG).

The media guidance application then receives a first input of a first authorization code. The first authorization code may be any combination of alphanumeric characters that can be matched to a stored string of alphanumeric characters. The media guidance application may receive the first identifier via user input using a user input interface, such as a touchscreen or remote control. For example, the media guidance application may receive the user input. "1578," via a remote control.

The media guidance application determines that the received first authorization code matches a stored first identifier granting access to view the media asset. For example, the media guidance application determines whether the received input, "1578," matches a value stored in memory for the first identifier. As a specific example, the media guidance application may access a parental control database which contains a plurality of identifiers associated with permissions (i.e., whether each code can access the media asset). The media guidance application may compare the received first authorization code with the stored identifiers to determine a match (e.g., by comparing the characters of the first authorization code with characters of each of the stored identifiers). After determining a match, the media guidance application retrieves data from a field in the database corresponding to the matched identifier and determines whether the data indicates a user has access to the media asset.

In some embodiments, the media guidance application retrieves, from a field in the parental control database including a plurality of entries with stored identifiers associated with users, the first stored identifier. For example, the media guidance application may execute an SQL program script utilizing the declarative "Select" statement to retrieve the value of the first stored identifier from a field in the database, such as "12345." The media guidance application may determine whether the first stored identifier matches the received authorization code by comparing characters of the first stored identifier with characters of the received authorization code. For example, the media guidance application may compare each indexed character of a received string (i.e., the first authorization code) with each indexed character of the stored identifier to determine whether the two strings match. The media guidance application may determine a match if the number or percentage of matched characters exceeds a threshold. For example, the media guidance application may determine that "1234567891" matches "1224567891," if a 90% match exceeds a threshold percentage (e.g., 75%).

In response to determining that the first stored identifier matches the received authorization code, the media guidance application retrieves a value from a field associated with the first stored identifier. For example, the media guidance application may retrieve a blocking criterion from a field associated with the first stored identifier (e.g., that the user identified by the first stored identifier cannot access media assets with a rating greater than TV-PG). The media guidance application then determines whether the user identified by the first stored identifier has access to the media asset based on the value. For example, the media guidance application may compare a blocking criterion retrieved from the field associated with the first stored identifier with metadata associated with the media asset to determine whether the user identified by the first stored identifier has permission to access the media asset. As a specific example, if the blocking criterion is the rating "TV-PG" and the media asset has a rating of "TV-MA." then the media guidance application may determine that the user does not have permission to access the media asset since the rating of the media asset exceeds the blocking criterion rating.

After determining that the received first authorization code matches the stored first identifier, the media guidance application generates the media asset for display. For example, the media guidance application may generate for display the media asset on a display connected to the user equipment. Alternatively or additionally, the media guidance application may query the parental control database for an indication whether the user identified by the first authorization code can view the media asset on a device not coupled to the user equipment (e.g., streamed to a mobile device, such as a cellular telephone).

In some embodiments, the media guidance application generates an instruction to allow access to view the media asset for a predetermined period of time. For example, after the media guidance application determines the user identified by the first authorization code has access to the media asset, the media guidance application may generate an instruction (e.g., in a program script) to allow access to the media asset for a period of time. The media guidance application may then execute the instruction, wherein the instruction stores a temporary indication, in a field associated with the first stored identifier in the parental control database, to allow access to view the media asset. For example, the media guidance application may execute the program script that was generated, which then stores an indication (e.g., a boolean value set to "true") in the parental control database that the user has access to the media asset. The media guidance application then, in response to executing the instruction, monitors an elapsed time. For example, the program script may store an end time in the parental control database when access to the media asset expires and the media guidance application may execute another program script to remove the indication when the time reaches the value in the end time. Alternatively, the media guidance application may continue running the program script, which monitors the clock time and removes the indication after the predetermined period of time. The media guidance application, in response to determining the elapsed time exceeds the predetermined period of time, deletes the temporary indication to allow access to view the media asset. For example, the media guidance application may reset the contents of the field where the indication was stored.

The media guidance application then receives a second request to execute an operation associated with the media asset. The operation may be any command or instruction that when executed alters or copies the stored audiovisual data for the media asset or any stored metadata relating to the media asset. For example, the media guidance application may receive a request via a user input interface (e.g., a touch screen) to delete the media asset. As another example, the media guidance application may receive a request via a user input interface to copy the media asset to another device. As yet another example, the media guidance application may receive a request to update a user profile (e.g., with the viewing progress or an indication that a user dislikes the media asset) associated with the first authorization code.

Based on receiving the second request, the media guidance application queries a parental control database for information relating to permissible operations associated with the media asset. For example, the media guidance application may, in a field of the parental control database for the identifier that matches the first authorization code, store a pointer to an array which lists media assets for which a user is granted to perform the operation. The parental control database may contain multiple fields, each with a pointer to an array indicating media assets for which a particular operation can be performed without a second authorization code (e.g., delete, modify, etc.). Alternatively or additionally, the media guidance application may store an indication of which operations require a second authorization code (e.g., they are not permissible with only the first authorization code) with metadata stored with the media asset. For example, the media guidance application may store the runtime, rating, original airdate, and other metadata as a header in the stored audiovisual data for the media asset, and may additionally contain indications of which operations require a second authorization code (e.g., a boolean value set based on whether a particular operation requires a second authorization code to be performed).

The media guidance application determines, from the information, that a second authorization code is required to execute the operation associated with the media asset, wherein the second authorization code is generated periodically as a function of time by a token mechanism remote from the user equipment. For example, based on retrieving the information from the parental control database, as described above for the stored media asset, the media guidance application determines whether a second factor is needed in order to execute the function. The second authorization code may be generated by a token mechanism (e.g., a standalone token or an application executed on a device, such as a cellular telephone) which can then be input (e.g., via a user input interface) to the media guidance application. The token may generate the authorization code based on a mathematical function of clock time, analogous to public-key authentication. In some embodiments, other suitable two-factor methods, such as asymmetric (private-public key) authentication may be used for the second authentication code.

The media guidance application receives a second input of the second authorization code generated at a first time. For example, the media guidance application may receive, via a user input interface, the second authorization code, such as "45678." The media guidance application may determine that the input was received at 10:23:30 (hours:minutes:seconds) on 05:31:16 (month:day:year) based on the clock time when the input was received. Alternatively or additionally, the media guidance application may receive a clock time with the inputted second authorization code based on the clock time of the device where the code was generated.

The media guidance application may then transmit, to an authorization database, the second authorization code generated at the first time. For example, the media guidance application may transmit the second authorization code to a database, which may be located remotely from the user equipment (e.g., on a server) and accessible via a communications network, or stored in memory at the user equipment. In some embodiments, the media guidance application may preprocess the second authorization code. For example, the media guidance application may generate a data packet containing the second authorization code and the time at which it was generated, as described above. In another example, the media guidance application may concatenate the time to the nearest second or minute before transmission, depending on how often new authorization codes are generated by the token mechanism.

The media guidance application, in response to transmitting, to the authorization database, the second authorization code generated at the first time, receives an indication granting authorization to execute the operation associated with the media asset based on the transmitted second authorization code matching a second identifier generated at the first time. For example, the media guidance application may receive a data packet from the authorization package with a boolean value set to "true" if the transmitted authorization code corresponds to a second identifier or "false" if it does not. The second identifier may be a second token mechanism with the same mathematical function of time which may compare the output at a particular time (e.g., the second identifier) with the received second authorization code. The token may be identified by the first authorization code, which allows the authorization database to determine whether the received second authorization code is correct. For example, the media guidance application may transmit that the user identified by first authorization code "1234" entered second authorization code "45678" to the authorization database. Instead of searching every token mechanism stored at the authorization database, the authorization database need only search for a token corresponding to user "1234" and determine whether "45678" was generated by that token mechanism at the particular time.

The media guidance application, based on receiving the indication that the second authorization code matches the stored second identifier, executes the operation related to the media asset. For example, the media guidance application may execute an instruction to clear or free the blocks of memory where a particular media asset is stored (e.g., delete the media asset).

In some embodiments, the operation comprises the media guidance application accessing blocks of memory containing data corresponding to the media asset. For example, the media guidance application may determine the particular blocks of memory where audiovisual data of the media asset is stored. The media guidance application may then copy the data contained in the blocks of memory corresponding to the media asset to a second user equipment. For example, the media guidance application may retrieve the stored audiovisual data and transmit it to another device, such as a mobile phone, such that the user can access the media asset remote from the user equipment.

In some embodiments, in response to copying the data, the media guidance application stores, in a field associated with the media asset in the parental control database, an indication that the media asset has been copied to the second user equipment. For example, the media guidance application may store, in an array of media assets copied to other user equipment pointed to in a field of the parental control database, an indication that the media asset has been copied (e.g., by adding an identifier of the media asset to the array). The media guidance application receives a third request to access the media asset on the first user equipment. For example, the media guidance application may receive a request to access the media asset on the user equipment that originally scheduled it for storage via a user input interface. The media guidance application then prevents access to the media asset on the first user equipment while the media asset is stored on the second user equipment. For example, the media guidance application may query the array and determine that, since the identifier of the media asset is in the array, that access is not permitted from the first user equipment. In this way, the media guidance application ensures that the media asset cannot be stored and viewed on multiple devices at the same time, by maintaining a "checked-out" mechanism.

In other embodiments, the operation comprises the media guidance application accessing a viewing progress data structure containing currently stored media assets. For example, the media guidance application may access the viewing progress data structure locally in storage or remotely at a server via a communications network. The viewing progress data structure may be organized such that each media asset has an associated viewing progress, which may be expressed in time or percentage viewed. The media guidance application then stores, in a field for the media asset, an indication that the media asset has been viewed to completion. For example, the media guidance application may update the field of the viewing progress data structure to reflect the current user's viewing progress of the media asset. As a specific example, the user may have completed the media asset and thus the media guidance application may set a "viewed to completion" flag to "true."

In some embodiments, the media guidance application, in response to receiving an indication not granting authorization to execute the operation associated with the media asset based on the transmitted second authorization code not matching the second identifier generated at the first time, queries the parental control database to determine whether there is an alternate second authorization code to allow the operation. For example, the media guidance application may receive a data packet from the authorization package with a boolean value set to "false" if the transmitted authorization code does not correspond to a second identifier. The media guidance application then accesses the parental control database and determines whether any other second-factor authorization sources are associated with the first stored identifier. For example, the media guidance application may determine that the user can also be identified via a biometric signature (e.g., an iris scan or facial recognition) as the second authorization code. In response to determining that there is an alternate second authorization code to allow the operation, the media guidance application generates for display an indication to input the alternate second authorization code. For example, the media guidance application may generate for display a prompt to use a camera (e.g., integrated into a cellular telephone) to input a biometric signature as the second authorization code.

In some embodiments, the media guidance application may prompt for the alternate second authorization code (e.g., from another source) only after a threshold number of failed matches to a second identifier for the original second authorization code. For example, if the media guidance application receives, from the authorization database, an indication that three consecutive transmitted second authorization codes failed to match the second stored identifier, the media guidance application may determine to prompt for the alternate second authorization code.

In some embodiments, the media guidance application receives a user input to schedule the media asset for storage. For example, the media guidance application may receive a user input via a user input interface (e.g., a remote control) to schedule a media asset for storage. As a specific example, the user may select a particular media asset listing in a grid-guide generated by the media guidance application, which results in the media asset being added to a scheduling database. The media guidance application, in response to receiving the user input, generates for display a user interface with a plurality of selectable options for restricting access to a corresponding plurality of operations. For example, the media guidance application may generate a user interface with buttons to require two-factor authentication for operations that can be performed (e.g., delete) with respect to the media asset. The media guidance application receives a selection of a selectable option for restricting access to a corresponding operation. For example, the media guidance application may receive a user selection via a user input interface to restrict access (e.g., require two-factor authentication) for a particular operation (e.g., delete). The media guidance application, in response to receiving the selection, stores in the parental control database, information that the operation requires the second authorization code. For example, the media guidance application may add an identifier of the media asset to an array a pointer in the parental control database points to for the operation, as described above. Alternatively or additionally, the media guidance application may store the indication with metadata of the stored media asset, as described above.

In some embodiments, the media guidance application accesses a user database including identifiers of users who have accessed the media asset. For example, the media guidance application may maintain a database or other appropriate data structure and store an identifier of a user in a field associated with an identifier of the media asset after a user accesses the media asset. As a specific example, the user identifier may be the first authorization code, such as "1111." The media guidance application then retrieves, from the field in the user database associated with the identifier, contact information for a device associated with a user who has accessed the media asset. For example, the media guidance application may determine that the user identified by authorization code "1111" has previously viewed the same media asset that the user identified by first authorization code "1234" has indicated they would like to perform an operation on and retrieves contact information (e.g., a cellular phone number or email address) of the user identified by authorization code "1111." As a specific example, the media guidance application may retrieve the mobile phone number "123-456-7890" from a field in the user database corresponding to the user identified by authorization code "1111." The media guidance application then transmits, to the device based on the contact information, a notification to the user that the operation associated with the media asset has been received. For example, the media guidance application may transmit a message to the mobile phone based on the retrieved phone number. The transmitted message may include details of the operation and/or the user that is trying to perform the operation. For example, the media guidance application may transmit the message, "User 'Steve' is trying to delete 'Game of Thrones, Season 6, episode 5'."

In addition to transmitting the notification to the user that the operation associated with the media asset has been received, in some embodiments, the media guidance application receives, from the device, an indication to prevent the operation. For example, the media guidance application may receive from the device to which the message was transmitted an indication to block the operation. As a specific example, if the notification was transmitted to a mobile phone of a user, the message may include text instructing the user to reply to the message if they wish to block the operation. In some embodiments, the media guidance application may determine whether the user has authority to block the operation based on an indication stored in the user database associated with the user and will only include the text instructing the user to reply to the message if they have authority to block the operation. The media guidance application then stores the indication in a second field of the parental control database associated with the media asset, wherein the indication prevents the operation from being executed. For example, the media guidance application may remove the media asset from the array of media assets the user has authority to delete (e.g., pointed to by a field in the parental control database) based on the received indication to block the operation. Alternatively or additionally, the media guidance application may add the media asset to an array in the parental control database for media assets where the user has been blocked by another user from performing operations.

Alternatively, the media guidance application may determine that the required second authorization code is a biometric signature of the user. For example, the media guidance application may perform the same steps outlined above, but instead of receiving a code generated by a token mechanism, the media guidance application receives a biometric signature. As a specific example, the biometric signature may be an iris scan, fingerprint scan, or facial map of a user transmitted to the media guidance application as an image. The media guidance application may analyze the biometric signature (e.g., by analyzing critical points/patterns in a pixel map of the received image) and compare to stored biometric signatures, or may transmit the biometric signature to a remote server which analyzes the biometric signature and determines whether it matches a second stored identifier, similar to as is described above for the authorization database and the token mechanism.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 is an illustrative example of a database structure for storing parental control information, in accordance with some embodiments of the disclosure;

DETAILED DESCRIPTION

Systems and methods are described herein for authorizing operations associated with blocked media assets using two-factor authentication. For example, a media guidance application (e.g., executed by a set-top box or other user equipment used to store and display media assets) prompts a user for a password (e.g., a PIN) in order to unlock the content for viewing. In response to receiving a second request from the user to perform an operation related to the media asset (e.g., delete), the media guidance application prompts the user for an additional factor confirming his or her identity, consistent with two-factor authentication protocol. If the user's identity is authenticated as a user that has authority to perform the operation related to the media asset (e.g., delete the stored media asset), the media guidance application performs the operation related to the media asset (e.g., deletes the media asset).

Figure 1:
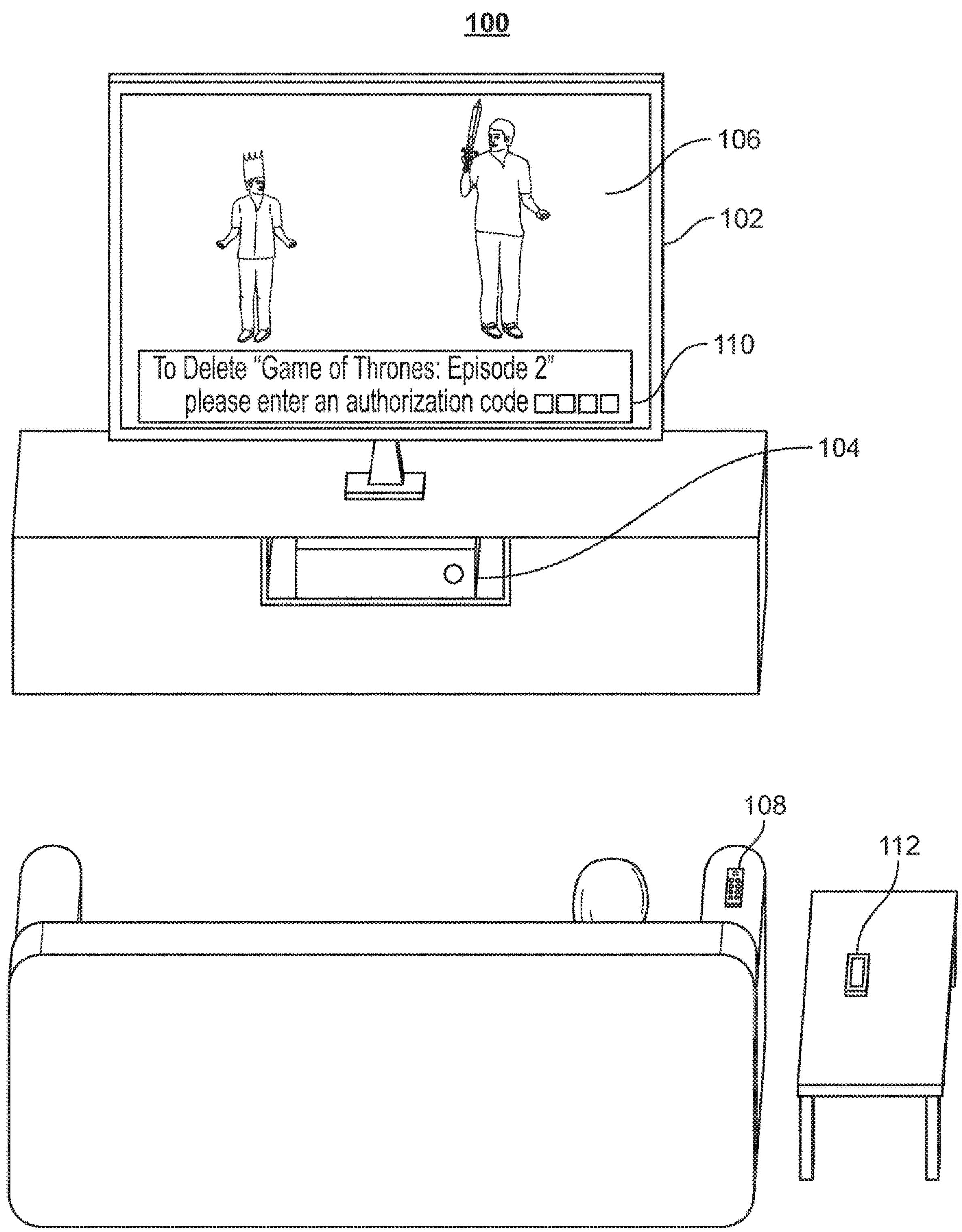
FIG. 1 shows an illustrative example of a two-factor authentication approach to perform an operation related to a media asset, in accordance with some embodiments of the disclosure.

FIG. 1 shows an illustrative example of a two-factor authentication approach to perform an operation related to a media asset, in accordance with some embodiments of the disclosure. For example, display 102 may be coupled to user equipment 104 which executes a media guidance application in order to display media asset 106. After receiving a request to perform an operation associated with media asset 106, the media guidance application may generate for display prompt 110 for input of an authorization code to perform the operation. Display 102 may appear on one or more user devices (e.g., any of the devices listed in FIGS. 7-8 below). Moreover, the media guidance application may use one or more of the processes described in FIGS. 9-13 to generate display 102 or any of the features described therein.

The media guidance application (e.g., executed on user equipment 104) receives a first request to access a media asset for viewing on user equipment, wherein access to the media asset is blocked. For example, the media guidance application may store a plurality of media assets in storage either local to the user device that generates media assets for display (e.g., in memory of user equipment 104) or remotely at a server. The media guidance application may generate a listing of media assets (e.g., in a user interface displayed on display 102) which the user can select for display. The media guidance application may set a flag, based on metadata associated with each stored media asset, indicating whether each media asset should be blocked for a given user. As a specific example, the media guidance application may set the flag based on metadata associated with the media asset (e.g., media asset 106) indicating that it fulfills a predefined blocking criterion (e.g., that a particular user cannot watch shows with a rating greater than TV-PG and media asset 106 has a content rating of TV-MA, which is greater than TV-PG).

The media guidance application then receives a first input of a first authorization code. The first authorization code may be any combination of alphanumeric characters that can be matched to a stored string of alphanumeric characters. The media guidance application may receive the first identifier via user input using a user input interface, such as remote control 108. For example, the media guidance application may receive the user input, "1578," via remote control 108.

The media guidance application determines that the received first authorization code matches a stored first identifier granting access to view the media asset. For example, the media guidance application determines whether the received input, "1578," matches a value stored in memory for the first identifier, as described further below with respect to FIG. 2. As a specific example, the media guidance application may access a parental control database which contains a plurality of identifiers associated with permissions (i.e., whether each code can access the media asset). The media guidance application may compare the received first authorization code with the stored identifiers to determine a match (e.g., by comparing the characters of the first authorization code with characters of each of the stored identifiers). After determining a match, the media guidance application retrieves data from a field in the database corresponding to the matched identifier and determines whether the data indicates a user has access to the media asset.

After determining that the received first authorization code matches the stored first identifier, the media guidance application generates the media asset for display. For example, the media guidance application may generate for display the media asset (e.g., media asset 106) on a display (e.g., display 102) connected to the user equipment (e.g., user equipment 104). Alternatively or additionally, the media guidance application may query the parental control database for an indication whether the user identified by the first authorization code can view the media asset on a device not coupled to the user equipment (e.g., streamed to a mobile device, such as cellular telephone 112). As described further below with respect to FIG. 2, the media guidance application may store a temporary indication granting access to the media asset (e.g., in the parental control database).

The media guidance application then receives a second request to execute an operation associated with the media asset. The operation may be any command or instruction that when executed alters or copies the stored audiovisual data for the media asset or any stored metadata relating to the media asset. For example, the media guidance application may receive a request via a user input interface (e.g., a touch screen on cellular telephone 112 or remote 108) to delete the media asset (e.g., media asset 106) from storage. As another example, the media guidance application may receive a request via a user input interface to copy the media asset to another device. As yet another example, the media guidance application may receive a request to update a user profile (e.g., with the viewing progress or an indication that a user dislikes the media asset) associated with the first authorization code.

Based on receiving the second request, the media guidance application queries a parental control database for information relating to permissible operations associated with the media asset. For example, the media guidance application may, in a field of the parental control database for the identifier that matches the first authorization code, store a pointer to an array which lists media assets a user is granted to perform the operation on. The parental control database may contain multiple fields, each with a pointer to an array indicating media assets where a particular operation can be performed without a second authorization code (e.g., delete, modify, etc.). Alternatively or additionally, the media guidance application may store an indication of which operations require a second authorization code (e.g., they are not permissible with only the first authorization code) with metadata stored with the media asset (e.g., media asset 106). For example, the media guidance application may store the runtime, rating, original airdate and other metadata as a header in the stored audiovisual data for the media asset (e.g., media asset 106), and may additionally contain indications of which operations require a second authorization code.

The media guidance application then determines, from the information, that a second authorization code is required to execute the operation associated with the media asset, wherein the second authorization code is generated periodically as a function of time by a token mechanism remote from the user equipment. For example, based on retrieving the information from the parental control database as described above for the stored media asset (e.g., media asset 106), the media guidance application determines whether a second factor is needed in order to execute the function. The second authorization code may be generated by a token (e.g., a standalone token or an application executed on a device, such as on cellular telephone 112) which can then be input (e.g., via a user input interface) to the media guidance application. The token may generate the authorization code based on a mathematical function of clock time, analogous to public-key authentication. In some embodiments, other two-factor authentication methods, such as asymmetric (private-public key) authentication may be used for the second authentication code.

The media guidance application receives a second input of the second authorization code generated at a first time. For example, the media guidance application may receive, via a user input interface, the second authorization code, such as "45678" (e.g., input to user equipment 104 using a user input interface). The media guidance application may determine that the input was received at 10:23:30 (hours:minutes:seconds) on 05:31:16 (month:day:year), based on the clock time when the input was received. Alternatively or additionally, the media guidance application may receive a clock time with the inputted second authorization code based on the clock time of the device (e.g., cellular telephone 112) where the code was generated.

The media guidance application may then transmit, to an authorization database, the second authorization code generated at the first time. For example, the media guidance application may transmit the second authorization code to a database, which may be located remotely from the user equipment (e.g., on a server) and accessible via a communications network, or stored in memory at the user equipment (e.g., user equipment 104). In some embodiments, the media guidance application may preprocess the second authorization code. For example, the media guidance application may generate a data packet containing the second authorization code and the time at which it was generated, as described above. In another example, the media guidance application may concatenate the time to the nearest second or minute before transmission, depending on how often new authorization codes are generated by the token mechanism.

The media guidance application, in response to transmitting, to the authorization database, the second authorization code generated at the first time, receives an indication granting authorization to execute the operation associated with the media asset based on the transmitted second authorization code matching a second identifier generated at the first time. For example, the media guidance application may receive a data packet from the authorization package with a boolean value set to "true" if the transmitted authorization code corresponds to a second identifier or "false" if it does not. The second identifier may be a second token mechanism with the same mathematical function of time which may compare the output at a particular time (e.g., the second identifier) with the received second authorization code. The token may be additionally identified by the first authorization code, which would allow the authorization database to more efficiently determine whether the received second authorization code is correct. For example, the media guidance application may transmit that the user identified by first authorization code "1234" entered second authorization code "45678" to the authorization database. Instead of searching every token mechanism stored at the authorization database, the authorization database need only search for a token corresponding to user "1234" and determine whether "45678" was generated by that token at the particular time.

The media guidance application, based on receiving the indication that the second authorization code matches the stored second identifier, executes the operation related to the media asset. For example, the media guidance application may execute an instruction to clear or free the blocks of memory where a particular media asset is stored (e.g., delete media asset 106 from storage).

In some embodiments, the operation may comprise the media guidance application accessing blocks of memory containing data corresponding to the media asset. For example, the media guidance application may determine the particular segments of memory where audiovisual data of the media asset (e.g., media asset 106) is stored (e.g., locally in storage of user equipment 104 or remotely at a server). The media guidance application may then copy the data contained in the blocks of memory corresponding to the media asset to a second user equipment. For example, the media guidance application may retrieve the stored audiovisual data and transmit it to another device, such as a mobile phone (e.g., cellular telephone 112), such that the user can access the media asset remote from the user equipment (e.g., user equipment 104).

In some embodiments, in response to copying the data, the media guidance application stores, in a field associated with the media asset in the parental control database, an indication that the media asset has been copied to the second user equipment. For example, the media guidance application may store, in an array of media assets copied to other user equipment pointed to in a field of the parental control database (e.g., as described below with respect to FIG. 2), an indication that the media asset has been copied (e.g., by adding an identifier of media asset 106 to the array). The media guidance application receives a third request to access the media asset on the first user equipment. For example, the media guidance application may receive a request to access the media asset (e.g., media asset 106) on the user equipment (e.g., user equipment 104) that originally scheduled it for storage via a user input interface. The media guidance application then prevents access to the media asset (e.g., media asset 106) on the first user equipment (e.g., user equipment 104) while the media asset is stored on the second user equipment (e.g., on cellular telephone 112). For example, the media guidance application may query the array and determine that, since the identifier of the media asset is stored in the array, that access is not permitted from the first user equipment. In this way, the media guidance application ensures that the media asset cannot be stored and viewed on multiple devices at the same time, by maintaining a "checked-out" mechanism.

In other embodiments, the operation comprises the media guidance application accessing a viewing progress data structure containing currently stored media assets. For example, the media guidance application may access the viewing progress data structure locally in storage (e.g., of user equipment 104) or remotely at a server via a communications network. The viewing progress data structure may be organized such that each media asset has an associated viewing progress, which may be expressed in time or percentage viewed. The media guidance application then stores, in a field for the media asset, an indication that the media asset has been viewed to completion. For example, the media guidance application may update the field of the viewing progress data structure to reflect the current user's viewing progress of the media asset (e.g., media asset 106). As a specific example, the user may have completed the media asset and thus the media guidance application may set a "viewed to completion" flag to "true."

Alternatively, the media guidance application may determine that the required second authorization code is a biometric signature of the user. For example, the media guidance application may perform the same steps outlined above, but instead of receiving a code generated by a token mechanism (e.g., by an application on cellular telephone 112), the media guidance application receives a biometric signature. As a specific example, the biometric signature may be an iris scan, fingerprint scan, or facial map of a user transmitted to the media guidance application as an image (e.g., taken by an integrated camera on user equipment 104 or cellular telephone 112). The media guidance application may analyze the biometric signature (e.g., by analyzing critical points/patterns in a pixel map of the received image) and compare to stored biometric signatures, or may transmit the biometric signature to a remote server which analyzes the biometric signature and determines whether it matches a second stored identifier, similar to as is described above with respect to the authorization database and the token mechanism.

FIG. 2 is an illustrative example of a database structure for storing parental control information, in accordance with some embodiments of the disclosure. For example, parental control database 200 and stored metadata 250 may be stored either locally in storage (e.g., on any of the devices listed in FIGS. 7-8 below), or remotely at a server accessible via a communications network. Moreover, the media guidance application may use one or more of the processes described in FIGS. 9-13 to generate parental control database 200 and stored metadata 250, or any of the features described therein.

Parental control database 200 may be organized as a table, with a plurality of identifiers (e.g., identifier 202) each with associated stored data. In some embodiments, the stored identifier may be the first authorization code (e.g., it is both an identifier of the user and an authorization code). In other embodiments, each identifier may have an associated user name (e.g., additional fields 210 contains a stored string for the user name such as "Dad") and/or a different associated authorization code.

For each identifier, the parental control database contains blocking criteria (e.g., blocking criterion 204), as well as an indication of a type of second factor that can be used for two-factor authentication of the particular identifier (e.g., second factor 206), as well as any alternative second factor (e.g., alternate second factor 208). The blocking criteria field may be a single field for each blocking criteria (e.g., more are stored in additional fields 210) or it may contain a pointer to an array containing all blocking criteria associated with the user (e.g., including blocking criterion 204). Second factor 206 and alternate second factor 208 are standard strings that, when retrieved by the media guidance application, instruct the media guidance application what program script to run. For example, the media guidance application may retrieve the string "token" from the parental control database and determine that in order to authenticate a particular identifier (e.g., corresponding to a user), a script to prompt the user for a second authorization code generated by a token mechanism needs to be executed.

Additional fields 210 may contain separate fields for each operation that can be performed with respect to media assets. Specifically, the media guidance application may store a pointer to an array for media assets a user is authorized (or not authorized) to perform a particular operation on. As an example, identifier "1234" (e.g., identifier 202) may be authorized to delete media assets "Game of Thrones" and "Westworld" since identifiers of those media assets are stored in the array pointed to from the parental control database for delete operations. Based on the identifiers in the arrays, the media guidance application may determine whether a second factor is needed to perform a requested operation (e.g., as described above with respect to FIG. 1) and then determine what second-factor (e.g., second factor 206) can be used to authenticate the user to allow them to perform the operation (if any).

Stored metadata 250 may contain metadata relating to the stored media asset and may be stored in memory with the data for the media asset (e.g., as a header in an audiovisual file containing data for the media asset). Stored metadata may contain total runtime 252, rating 254, as well as indications about which operations require a second factor to perform. For example, the media guidance application may store a boolean set to "true" if two-factor authentication is required (e.g., second factor to delete 256) or "false" if two-factor authentication is not required (e.g., second factor to copy 258 and second factor to update viewing progress 260). In some embodiments, the media guidance application may store specific users for which two-factor authentication is required to perform the operation (e.g., in additional fields 262).

In some embodiments, the media guidance application retrieves, from a field in the parental control database (e.g., parental control database 200) including a plurality of entries with stored identifiers (e.g., identifier 202) associated with users, the first stored identifier. For example, the media guidance application may execute an SQL program script utilizing the declarative "Select" statement to retrieve the value of the first stored identifier from a field in the database, such as "1234." The media guidance application may determine whether the first stored identifier (e.g. identifier 202) matches the received authorization code by comparing characters of the first stored identifier with characters of the received authorization code. For example, the media guidance application may compare each indexed character of a received string (i.e., the first authorization code) with each indexed character of the stored identifier to determine whether the two strings match. The media guidance application may determine a match if the number or percentage of matched characters exceeds a threshold. For example, the media guidance application may determine that "1234567891" matches "1224567891," if a 90% match exceeds a threshold percentage (e.g., 75%).

In response to determining that the first stored identifier matches the received authorization code, the media guidance application then retrieves a value from a field associated with the first stored identifier. For example, the media guidance application may retrieve a blocking criterion (e.g., blocking criterion 204) from a field associated with the first stored identifier (e.g., that the user identified by the first stored identifier cannot access media assets with a rating greater than TV-PG). The media guidance application then determines whether the user identified by the first stored identifier has access to the media asset based on the value. For example, the media guidance application may compare a blocking criterion retrieved from the field associated with the first stored identifier with metadata associated with the media asset (e.g., stored metadata 250) to determine whether the user identified by the first stored identifier has permission to access the media asset. As a specific example, if the blocking criterion is the rating "TV-PG" and the media asset has a rating of "TV-MA" (e.g., as indicated by stored metadata 250), then the media guidance application may determine that the user does not have permission to access the media asset since the rating of the media asset exceeds the blocking criterion rating.

In some embodiments, the media guidance application generates an instruction to allow access to view the media asset for a predetermined period of time. For example, after the media guidance application determines the user identified by the first authorization code (e.g., which may be identifier 202 as described above) has access to the media asset, the media guidance application may generate an instruction (e.g., by executing a program script) to allow access to the media asset for a period of time. The media guidance application may then execute the instruction, wherein the instruction stores a temporary indication, in a field associated with the first stored identifier in the parental control database (e.g., parental control database 200), to allow access to view the media asset. For example, the media guidance application may execute the program script that was generated, which then stores an indication (e.g., a boolean value set to "true") in the parental control database (e.g., in additional fields 210 of parental control database 200) that the user has access to the media asset. The media guidance application then, in response to executing the instruction, monitors an elapsed time. For example, the program script may store an end time in the parental control database (e.g., in parental control database 200) when access to the media asset expires and the media guidance application may execute another program script to remove the indication when the time reaches the value in the end time. Alternatively, the media guidance application may continue running the program script, which monitors the clock time and removes the indication after the predetermined period of time. The media guidance application, in response to determining the elapsed time exceeds the predetermined period of time, deletes the temporary indication to allow access to view the media asset. For example, the media guidance application may reset the contents of the field (e.g., one of additional fields 210 in parental control database 200) where the indication was stored.

In some embodiments, the media guidance application, in response to receiving an indication not granting authorization to execute the operation associated with the media asset based on the transmitted second authorization code not matching the second identifier generated at the first time, queries the parental control database to determine whether there is an alternate second authorization code to allow the operation. For example, the media guidance application may receive a data packet from the authorization package with a boolean value set to "false" if the transmitted authorization code does not correspond to a second identifier. The media guidance application then accesses the parental control database (e.g., parental control database 200) and determines whether any other second-factor authorization sources are associated with the first stored identifier (e.g., alternate second authorization factor 208). For example, the media guidance application may determine that the user can also be identified via a biometric signature (e.g., an iris scan or facial recognition) as the second authorization code based on data stored in the parental control database (e.g., alternate second authorization factor 208). In response to determining that there is the second authorization code to allow the operation, the media guidance application generates for display an indication to input the alternate second authorization code. For example, the media guidance application may generate for display a prompt to use a camera (e.g., integrated into a cellular telephone) to input a biometric signature as the second authorization code.

In some embodiments, the media guidance application may prompt for the alternate second authorization code (e.g., from another source) only after a threshold number of failed matches to a second identifier for the original second authorization code (e.g., second factor 206). For example, if the media guidance application receives, from the authorization database, an indication that three consecutive transmitted second authorization codes failed to match the second stored identifier, the media guidance application may determine to prompt for the alternate second authorization code (e.g., alternate second authorization factor 208).

Figure 3:
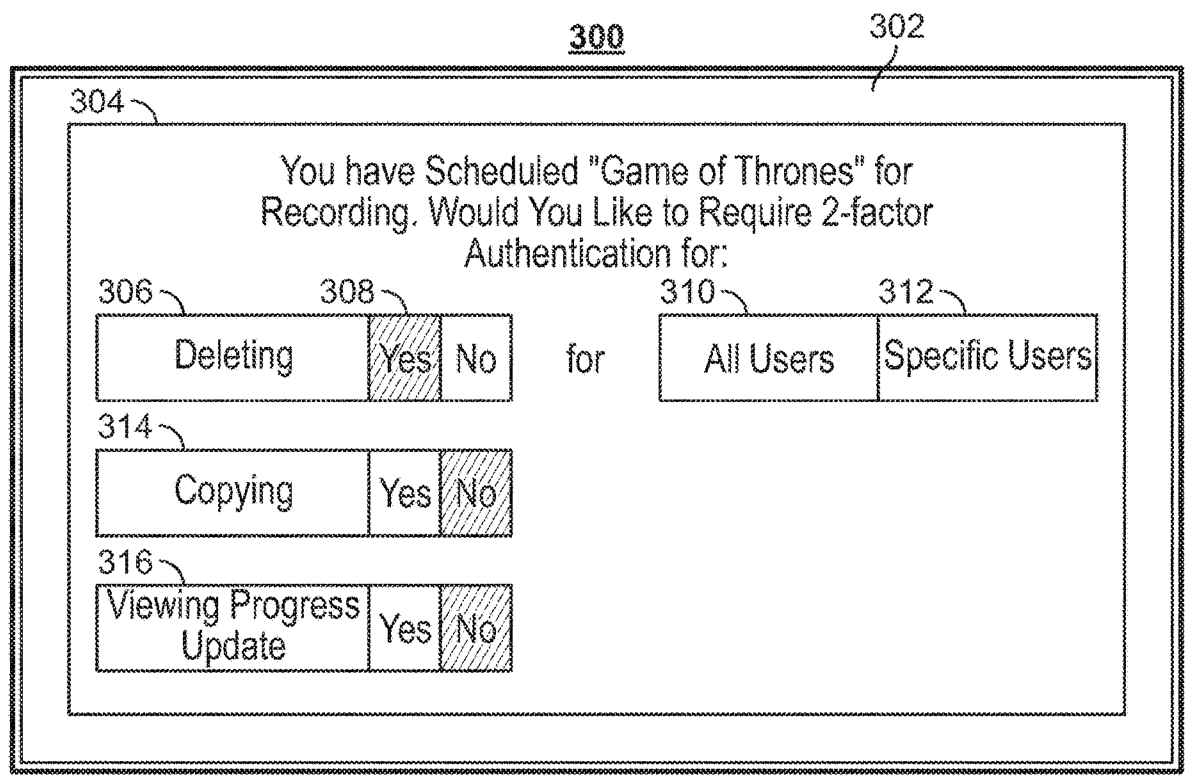
FIG. 3 is an illustrative display of a user interface for requiring two-factor authentication for operations associated with a media asset, in accordance with some embodiments of the disclosure.

FIG. 3 is an illustrative display of a user interface for requiring two-factor authentication for operations associated with a media asset, in accordance with some embodiments of the disclosure. For example, the media guidance application may generate for display on display 302 permissions menu 304. Display 302 may appear on one or more user devices (e.g., any of the devices listed in FIGS. 7-8 below). Moreover, the media guidance application may use one or more of the processes described in FIGS. 9-13 to generate display 302 or any of the features described therein.

Permissions menu 304 may contain text, indicating an identifier of a media asset a user is scheduling for storage (e.g., "Game of Thrones"), as well as a prompt containing options to set permissions for operations that will require two-factor authentication. For example, the media guidance application may generate a plurality of options that when selected require two-factor authentication to perform the corresponding operation, such as option to delete 306, option to copy 314, and option to update viewing progress 316. In some embodiments, selection of an option requiring two-factor authentication for a specific operation (e.g., option to delete 306 as indicate by indicator 308) may be further customized for specific users (e.g., via selection of specific users 312) or may be set for all users (e.g., via selection of all users 310).

In some embodiments, the media guidance application receives a user input to schedule the media asset for storage. For example, the media guidance application may receive a user input via a user input interface (e.g., a remote control) to schedule a media asset for storage. As a specific example, the user may select a particular media asset listing in a grid-guide generated by the media guidance application, which results in the media asset being added to a scheduling database. The media guidance application, in response to receiving the user input, generates for display a user interface (e.g., including permissions menu 304) with a plurality of selectable options (e.g., options 306, 314, and/or 316) for restricting access to a corresponding plurality of operations. For example, the media guidance application may generate a user interface with buttons to require two-factor authentication for operations that can be performed (e.g., option to delete 306) with respect to the media asset. The media guidance application receives a selection of a selectable option for restricting access to a corresponding operation. For example, the media guidance application may receive a user selection via a user input interface to restrict access (e.g., require two-factor authentication) for a particular operation (e.g., delete). The media guidance application, in response to receiving the selection, stores in the parental control database (e.g., as described above with respect to FIG. 2), information that the operation requires the second authorization code. For example, the media guidance application may add an identifier of the media asset to an array a pointer in the parental control database points to for the operation, as described above. Alternatively or additionally, the media guidance application may store the indication with metadata of the stored media asset, as described above with respect to FIG. 2.

Figure 4:
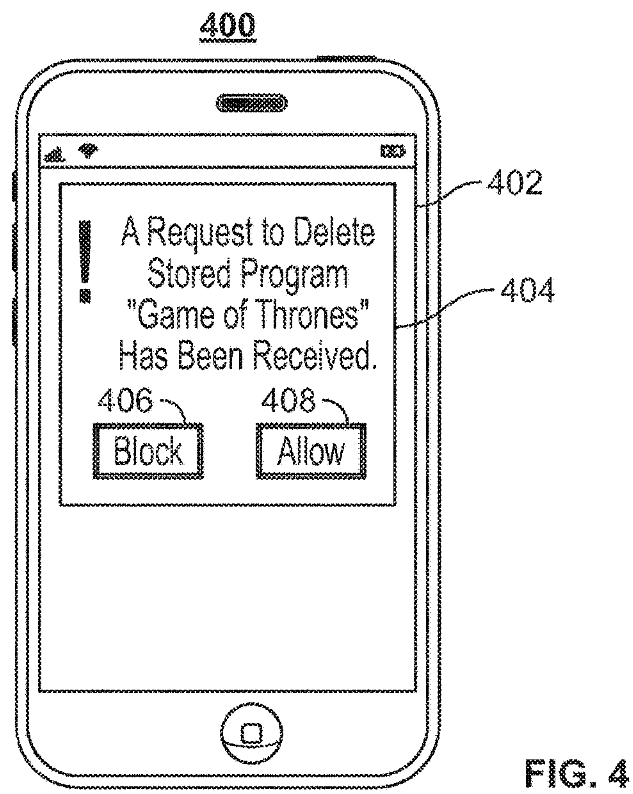
FIG. 4 is an illustrative display of a user interface for blocking an operation associated with a media asset, in accordance with some embodiments of the disclosure.

FIG. 4 is an illustrative display of a user interface for blocking an operation associated with a media asset, in accordance with some embodiments of the disclosure. For example, the media guidance application may generate for display on display 402 of mobile device 400 alert 404. Alert 404 may contain text indicating that a request to perform a particular operation (e.g., delete) was received by the media guidance application. Alert 404 may additionally generate for display selectable options to block 406 and allow 408 the operation. Display 402 may appear on one or more user devices (e.g., any of the devices listed in FIGS. 7-8 below). Moreover, the media guidance application may use one or more of the processes described in FIGS. 9-13 to generate display 402 or any of the features described therein.

In some embodiments, the media guidance application accesses a user database including identifiers of users who have accessed the media asset. For example, the media guidance application may maintain a database or other appropriate data structure and store an identifier of a user in a field associated with an identifier of the media asset after a user accesses the media asset. As a specific example, the user identifier may be the first authorization code, such as "1111." In some embodiments, the user database may be associated with the parental control database discussed above with respect to FIG. 2 (e.g., pointed to or linked via an index data structure). The media guidance application then retrieves, from the field in the user database associated with the identifier, contact information for a device associated with a user who has accessed the media asset. For example, the media guidance application may determine that the user identified by authorization code "1111" has previously viewed the same media asset that the user identified by first authorization code "1234" has indicated they would like to perform an operation on and retrieves contact information (e.g., for mobile device 400) of the user identified by authorization code "1111." As a specific example, the media guidance application may retrieve the mobile phone number "123-456-7890" from a field in the user database corresponding to the user identified by authorization code "1111." The media guidance application then transmits, to the device (e.g., mobile device 400) based on the contact information, a notification to the user that the operation associated with the media asset has been received. For example, the media guidance application may transmit a message to the mobile phone based on the retrieved phone number. The transmitted message may include details of the operation and/or the user that is trying to perform the operation. For example, the media guidance application may transmit the message, "User 'Steve' is requesting to delete 'Game of Thrones, Season 6, episode 5'."

In addition to transmitting the notification to the user that the operation associated with the media asset has been received, in some embodiments the media guidance application receives, from the device, an indication to prevent the operation. For example, the media guidance application may receive from the device to which the message was transmitted an indication to block the operation (e.g., via user input selecting option to block 406). As a specific example, if the notification was transmitted to a mobile phone of a user, the message may include text instructing the user to reply to the message if they wish to block the operation. In some embodiments, the media guidance application may determine whether the user has authority to block the operation based on an indication stored in the user database associated with the user and will only include the text instructing the user to reply to the message if they have authority to block the operation. The media guidance application then stores the indication in a second field of the parental control database associated with the media asset, wherein the indication prevents the operation from being executed. For example, the media guidance application may remove the media asset from the array of media assets the user has authority to delete (e.g., pointed to by a field in the parental control database as described above with respect to FIG. 2) based on the received indication to block the operation. Alternatively or additionally, the media guidance application may add the media asset to an array in the parental control database for media assets where the user has been blocked by another user from performing operations.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
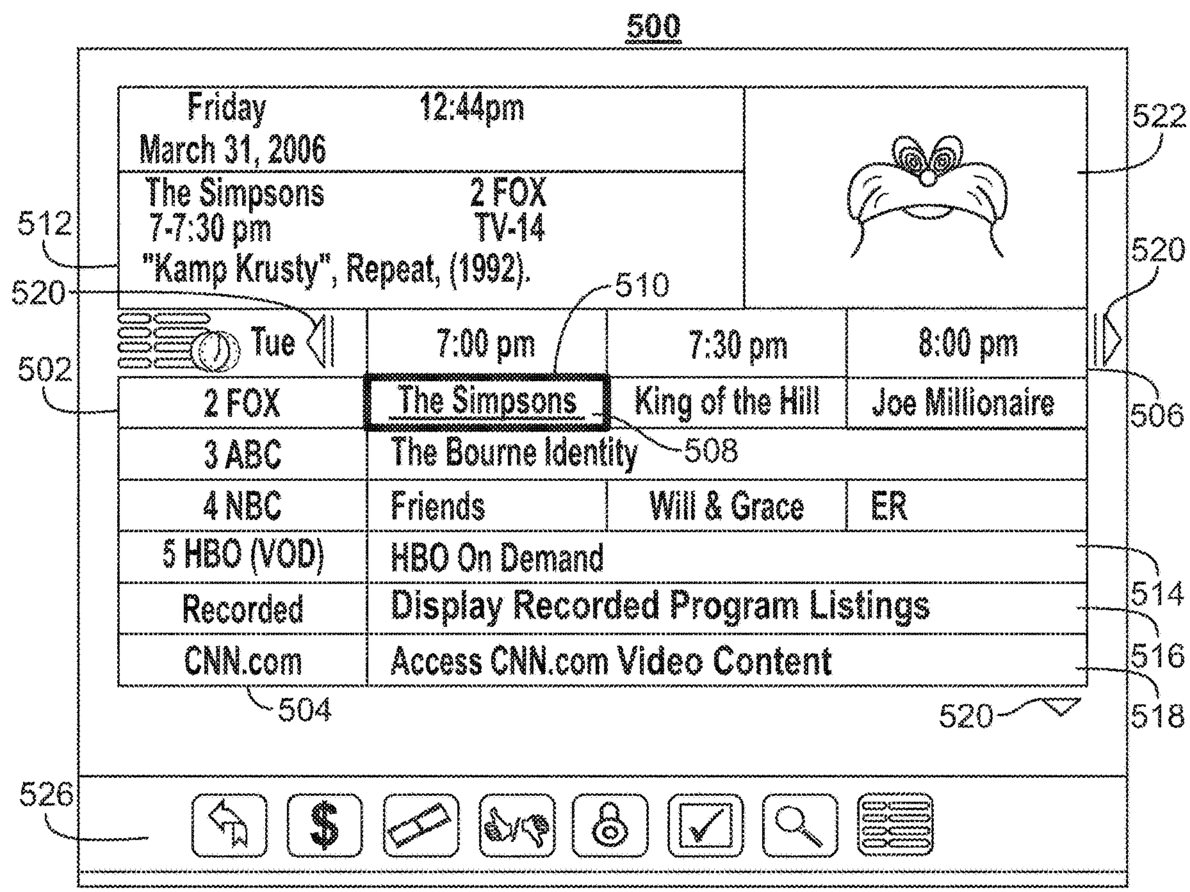
FIG. 5 shows an illustrative example of a media guidance display for navigating and selecting media assets in accordance with some embodiments of the disclosure.
Figure 6:
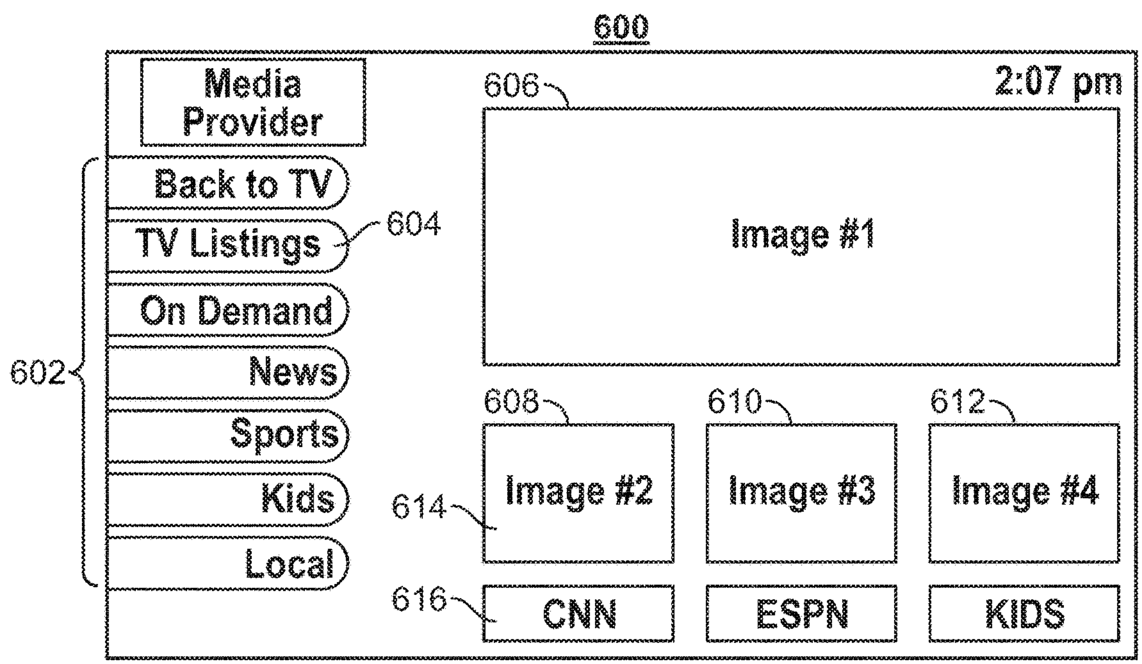
FIG. 6 shows another illustrative example of a media guidance display for navigating and selecting media assets in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
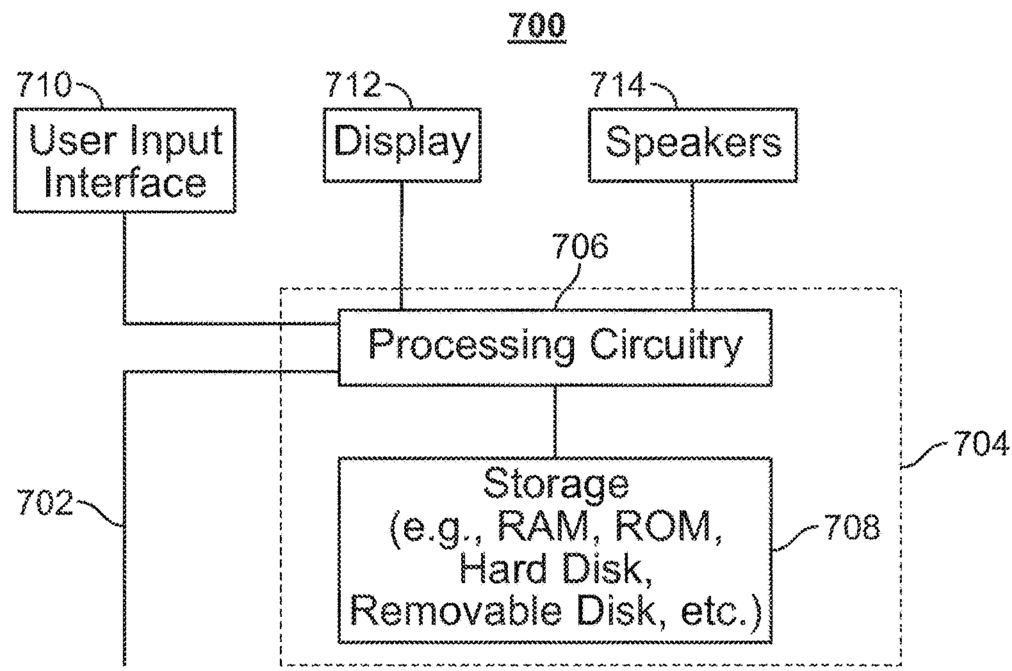
FIG. 7 is a block diagram of an illustrative user equipment device in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
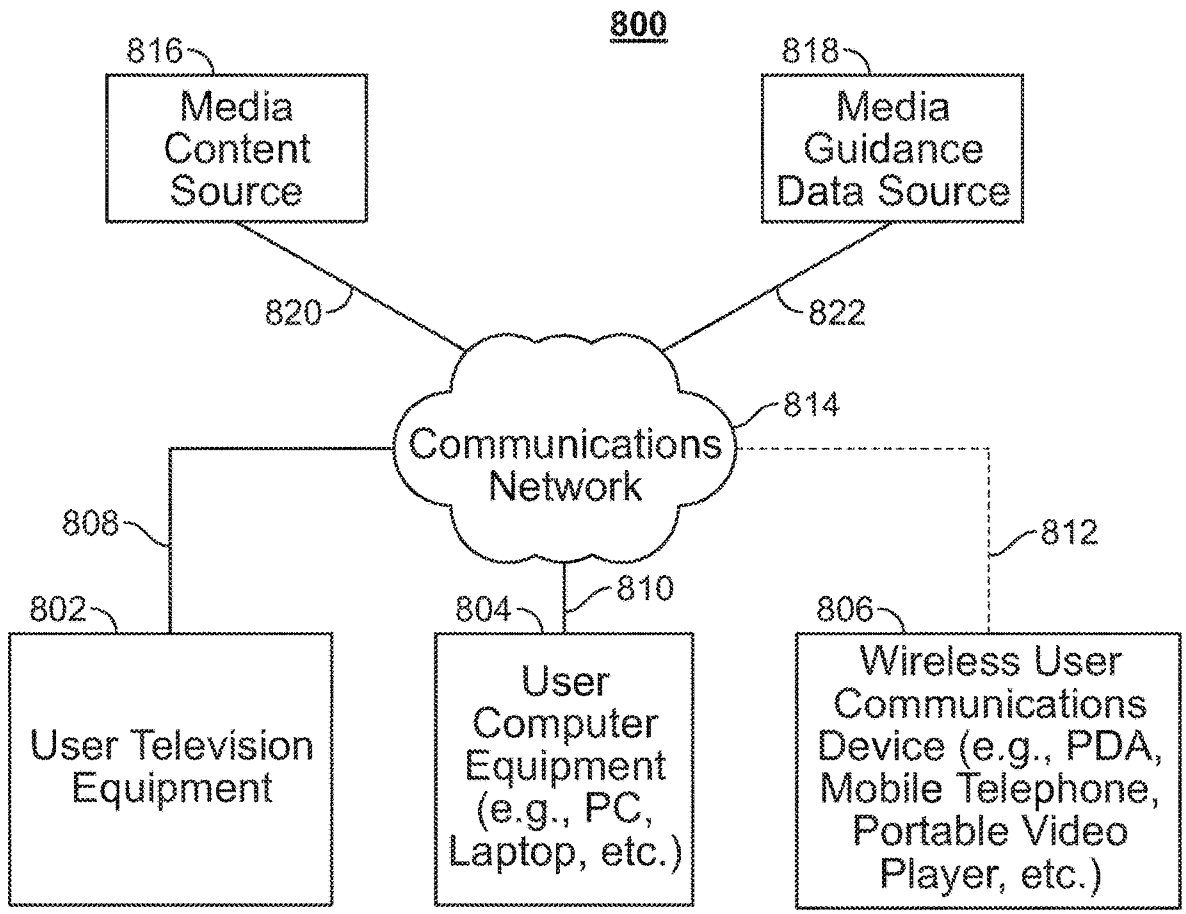
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-1 Ix, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example. Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
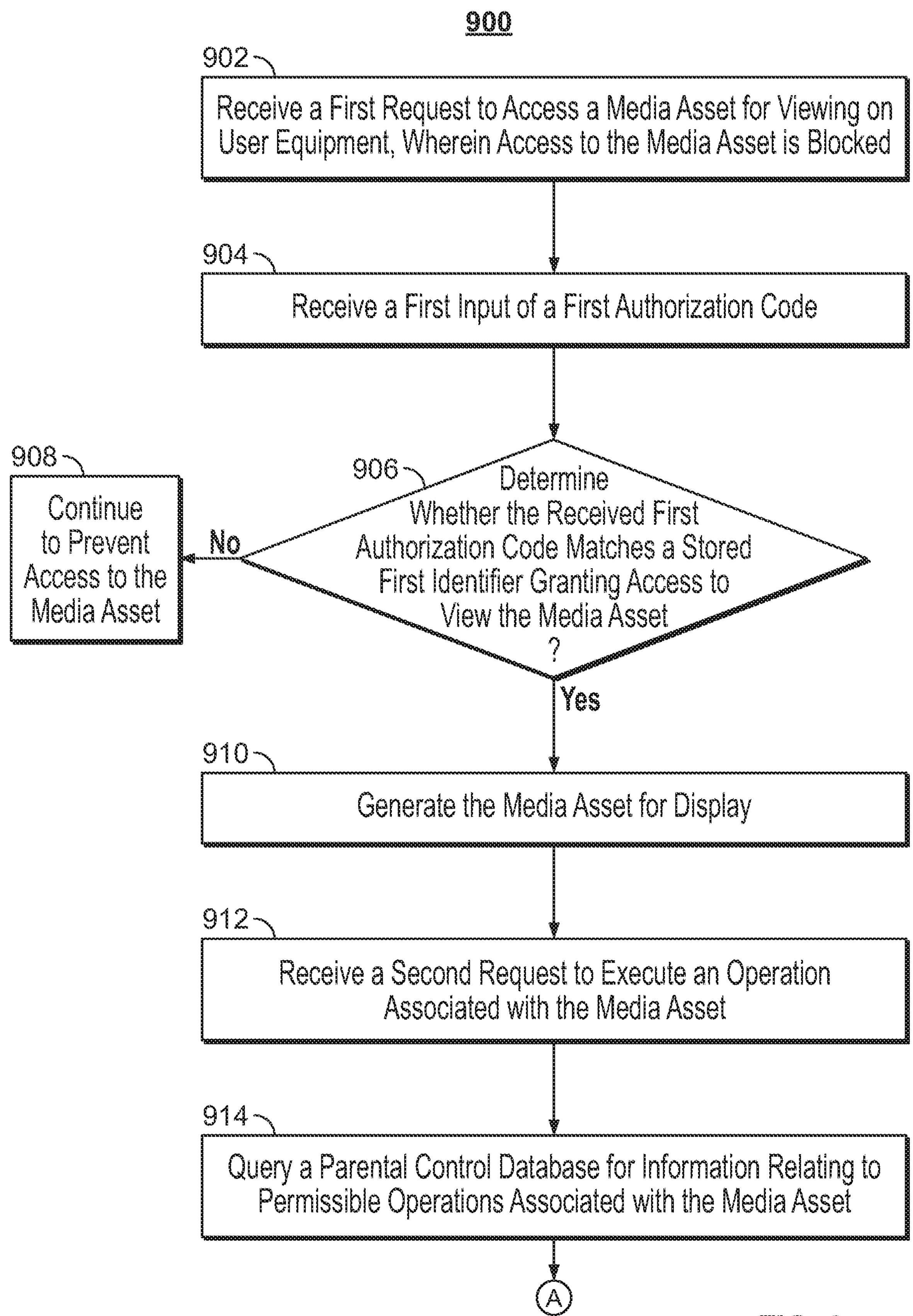
FIG. 9 is a flowchart of illustrative steps for authorizing operations associated with blocked media assets using two-factor authentication, in accordance with some embodiments of the disclosure.
Figure 9:
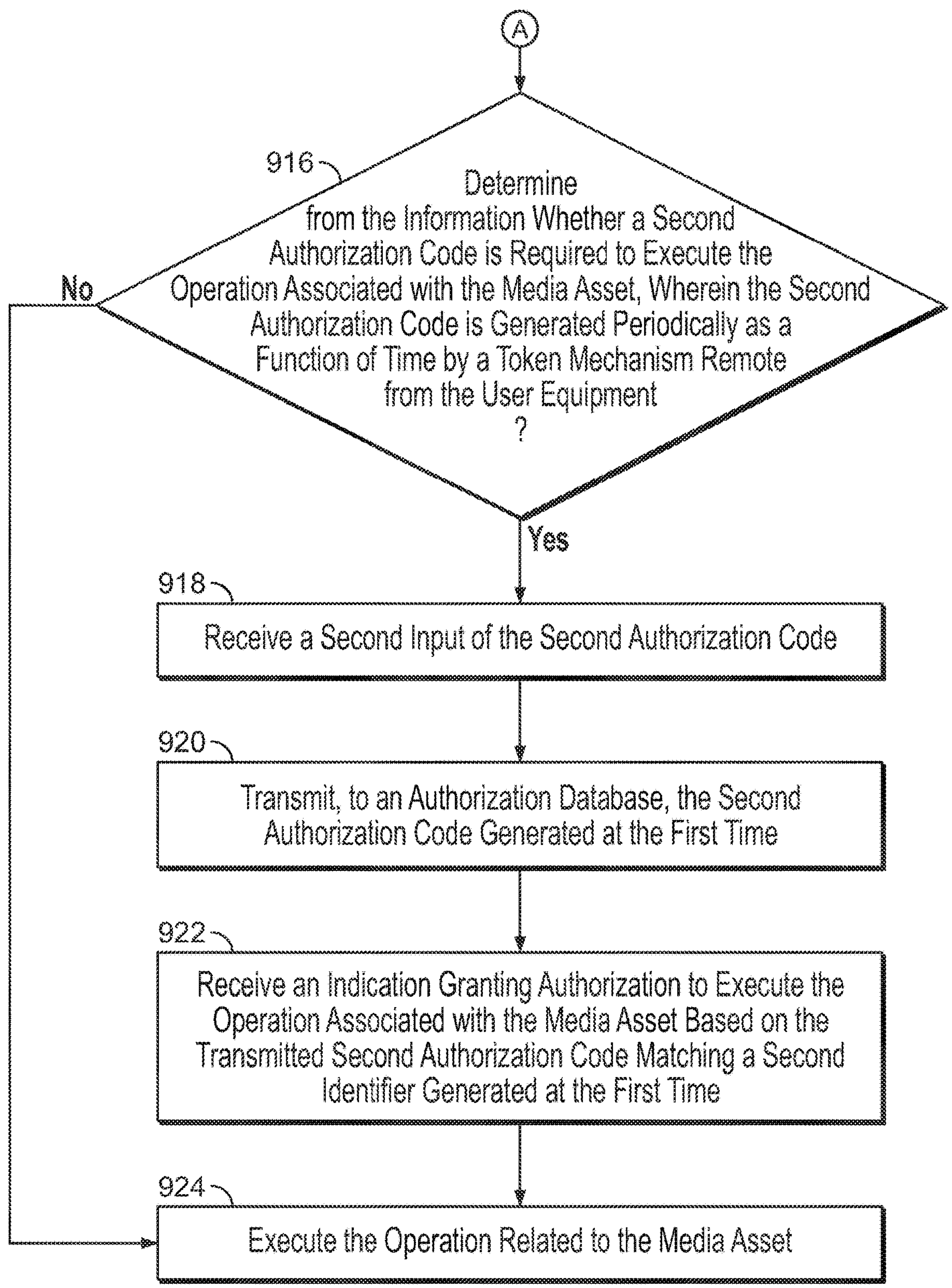

FIG. 9 is a flowchart of illustrative steps for authorizing operations associated with blocked media assets using two-factor authentication, in accordance with some embodiments of the disclosure. For example, a media guidance application implementing process 900 may be executed by control circuitry 704 (FIG. 7). It should be noted that process 900 or any step thereof could be performed on, or provided by, any of the devices or equipment shown in FIGS. 7-8.

Process 900 begins at 902, where the media guidance application receives (e.g., via control circuitry 704 (FIG. 7)) a first request to access a media asset for viewing on user equipment, wherein access to the media asset is blocked. For example, the media guidance application may store (e.g., via control circuitry 704 (FIG. 7)) a plurality of media assets in storage either local to the user device that generates media assets for display (e.g., storage 708) or remotely at a server (e.g., media guidance data source 818 accessible via communications network 814). The media guidance application may generate a listing of media assets (e.g., in a user interface on display 712) which the user can select for display. The media guidance application may set (e.g., via control circuitry 704 (FIG. 7)) a flag, based on metadata associated with each stored media asset, indicating whether each media asset should be blocked for a given user. As a specific example, the media guidance application may set (e.g., via control circuitry 704 (FIG. 7)) the flag based on metadata associated with the media asset indicating that it fulfills a predefined blocking criterion (e.g., that a particular user cannot watch shows with a rating greater than TV-PG).

Process 900 continues to 904, where the media guidance application receives (e.g., via control circuitry 704 (FIG. 7)) a first input of a first authorization code. The first authorization code may be any combination of alphanumeric characters that can be matched to a stored string of alphanumeric characters. The media guidance application may receive (e.g., via control circuitry 704 (FIG. 7)) the first identifier via user input using a user input interface (e.g., user input interface 710), such as a touchscreen or remote control. For example, the media guidance application may receive (e.g., via control circuitry 704 (FIG. 7)) the user input, "1578," via a remote control.

Process 900 continues to 906, where the media guidance application determines (e.g., via control circuitry 704 (FIG. 7)) whether the received first authorization code matches a stored first identifier (e.g., stored locally in storage 708 or remotely at a server (e.g., media guidance data source 818 accessible via communications network 814)) granting access to view the media asset. For example, the media guidance application determines (e.g., via control circuitry 704 (FIG. 7)) whether the received input, "1578," matches a value stored in memory for the first identifier. As a specific example, the media guidance application may access a parental control database (e.g., stored locally in storage 708 or remotely at a server (e.g., media guidance data source 818 accessible via communications network 814)), which contains a plurality of identifiers associated with permissions (i.e., whether each code can access the media asset). The media guidance application may compare (e.g., via control circuitry 704 (FIG. 7)) the received first authorization code with the stored identifiers to determine a match (e.g., by comparing the characters of the first authorization code with characters of each of the stored identifiers). After determining a match, the media guidance application retrieves (e.g., via control circuitry 704 (FIG. 7)) data from a field in the database corresponding to the matched identifier and determines whether the data indicates a user has access to the media asset.

If the media guidance application determines the received first authorization code does not match a stored first identifier granting access to view the media asset, process 900 continues to 908, where the media guidance application continues (e.g., via control circuitry 704 (FIG. 7)) to prevent access to the media asset. For example, the media guidance application may determine (e.g., via control circuitry 704 (FIG. 7)) that the received first authorization code does not match any identifiers stored in the parental control database, or that the particular user defined by the first authorization code does not have permission to access the media asset (e.g., via a blocking criterion as described above with respect to FIG. 2).

If the media guidance application determines the received first authorization code matches a stored first identifier granting access to view the media asset, process 900 continues to 910, where the media guidance application generates (e.g., via control circuitry 704 (FIG. 7)) the media asset for display. For example, the media guidance application may generate for display the media asset on a display (e.g., on display 712) connected to the user equipment (e.g., any of user equipment described above in FIGS. 7-8). Alternatively or additionally, the media guidance application may query (e.g., via control circuitry 704 (FIG. 7)) the parental control database for an indication whether the user identified by the first authorization code can view the media asset on a device not coupled to the user equipment storing the media asset (e.g., streamed to a mobile device, such as a cellular telephone).

Process 900 continues to 912, where the media guidance application receives (e.g., via control circuitry 704 (FIG. 7)) a second request to execute an operation associated with the media asset. The operation may be any command or instruction that when executed alters or copies the stored audiovisual data for the media asset or any stored metadata relating to the media asset. For example, the media guidance application may receive (e.g., via control circuitry 704 (FIG. 7)) a request via a user input interface (e.g., a touch screen) to delete the media asset. As another example, the media guidance application may receive (e.g., via control circuitry 704 (FIG. 7)) a request via a user input interface to copy the media asset to another device. As yet another example, the media guidance application may receive (e.g., via control circuitry 704 (FIG. 7)) a request to update a user profile (e.g., with the viewing progress or an indication that a user dislikes the media asset) associated with the first authorization code.

Process 900 continues to 914, where the media guidance application queries (e.g., via control circuitry 704 (FIG. 7)) a parental control database for information relating to permissible operations associated with the media asset. For example, the media guidance application may, in a field of the parental control database for the identifier that matches the first authorization code, store (e.g., via control circuitry 704 (FIG. 7)) a pointer to an array which lists media assets a user is granted to perform the operation on. The parental control database may contain multiple fields, each with a pointer to an array indicating media assets where a particular operation can be performed without a second authorization code (e.g., delete, modify, etc.). Alternatively or additionally, the media guidance application may store (e.g., via control circuitry 704 (FIG. 7)) an indication of which operations require a second authorization code (e.g., they are not permissible with only the first authorization code) with metadata stored with the media asset. For example, the media guidance application may store (e.g., via control circuitry 704 (FIG. 7)) the runtime, rating, original airdate and other metadata as a header in the stored audiovisual data for the media asset, and may additionally contain indications of which operations require a second authorization code.

Process 900 continues to 916, where the media guidance application determines (e.g., via control circuitry 704 (FIG. 7)) from the information whether a second authorization code is required to execute the operation associated with the media asset, wherein the second authorization code is generated periodically as a function of time by a token mechanism remote from the user equipment. For example, based on retrieving the information from the parental control database as described above for the stored media asset, the media guidance application determines (e.g., via control circuitry 704 (FIG. 7)) whether a second factor is needed in order to execute the function. The second authorization code may be generated by a token mechanism (e.g., a standalone token or an application executed on a device, such as a cellular telephone) which can then be input (e.g., via a user input interface) to the media guidance application. The token may generate the authorization code based on a mathematical function of clock time, analogous to public-key authentication. In some embodiments, other two-factor methods, such as asymmetric (private-public key) authentication may be used for the second authentication code.

If the media guidance application determines a second authorization code is not required to execute the operation, process 900 continues to 924, where the media guidance application executes (e.g., via control circuitry 704 (FIG. 7)) the operation related to the media asset. For example, based on querying the parental control database and determining that an identifier of the media asset is stored in an array indicating a particular user (e.g., identified by the first authorization code) can perform the operation for those media assets, the media guidance application may execute (e.g., via control circuitry 704 (FIG. 7) the operation without further input (e.g., no second-factor is required). As a specific example, the media guidance application may execute (e.g., via control circuitry 704 (FIG. 7) a program script to clear the blocks of memory where a particular media asset is stored (e.g., delete the media asset), or any of the operations described above with respect to FIGS. 1-4.

If the media guidance application determines a second authorization code is required to execute the operation, process 900 continues to 918, where the media guidance application receives (e.g., via control circuitry 704 (FIG. 7)) a second input of the second authorization code. For example, the media guidance application may receive (e.g., via control circuitry 704 (FIG. 7)), via a user input interface (e.g., user input interface 710), the second authorization code, such as "45678." The media guidance application may determine (e.g., via control circuitry 704 (FIG. 7)) that the input was received at 10:23:30 (hours:minutes:seconds) on 05:31:16 (month:day:year), based on the clock time when the input was received. Alternatively or additionally, the media guidance application may receive (e.g., via control circuitry 704 (FIG. 7)) a clock time with the inputted second authorization code based on the clock time of the device where the code was generated.

Process 900 continues to 920, where the media guidance application transmits (e.g., via control circuitry 704 (FIG. 7)), to an authorization database, the second authorization code generated at the first time. For example, the media guidance application may transmit (e.g., via control circuitry 704 (FIG. 7)) the second authorization code to a database (e.g., stored locally in storage 708 or remotely at a server (e.g., media guidance data source 818 accessible via communications network 814)). In some embodiments, the media guidance application may preprocess (e.g., via control circuitry 704 (FIG. 7)) the second authorization code. For example, the media guidance application may generate (e.g., via control circuitry 704 (FIG. 7)) a data packet containing the second authorization code and the time at which it was generated, as described above. In another example, the media guidance application may concatenate (e.g., via control circuitry 704 (FIG. 7)) the time to the nearest second or minute before transmission, depending on how often new authorization codes are generated by the token mechanism.

Process 900 continues to 922, where the media guidance application receives (e.g., via control circuitry 704 (FIG. 7)) an indication granting authorization to execute the operation associated with the media asset based on the transmitted second authorization code matching a second identifier generated at the first time. For example, the media guidance application may receive (e.g., via control circuitry 704 (FIG. 7)) a data packet from the authorization package with a boolean value set to "true" if the transmitted authorization code corresponds to a second identifier or "false" if it does not. The second identifier may be a second token mechanism with the same mathematical function of time which may compare the output at a particular time (e.g., the second identifier) with the received second authorization code. The token may be additionally identified by the first authorization code, which would allow the authorization database to more efficiently determine whether the received second authorization code is correct. For example, the media guidance application may transmit (e.g., via control circuitry 704 (FIG. 7)) that the user identified by first authorization code "1234" entered second authorization code "45678" to the authorization database. Instead of searching every token mechanism stored at the authorization database, the authorization database need only search for a token corresponding to user "1234" and determine whether "45678" was generated by that token at the particular time.

After receiving the indication, process 900 continues to 924, where the media guidance application executes (e.g., via control circuitry 704 (FIG. 7)) the operation related to the media asset, as described above. As a specific example, the media guidance application may execute (e.g., via control circuitry 704 (FIG. 7) a program script to clear the blocks of memory where a particular media asset is stored (e.g., delete the media asset), or any of the operations described above with respect to FIGS. 1-4.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 7-8 could be used to perform one or more of the steps in FIG. 9.

Figure 10:
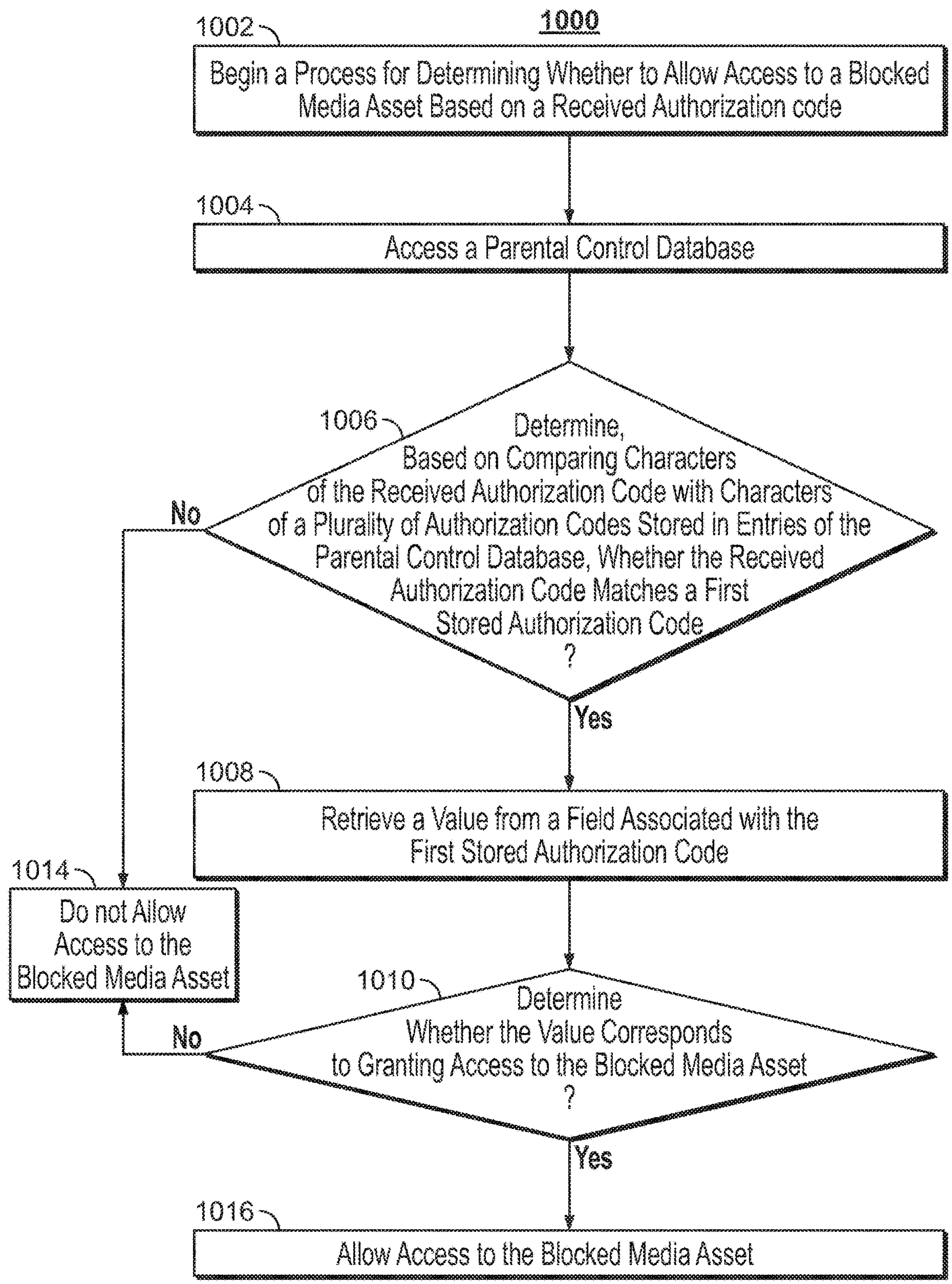
FIG. 10 is a flowchart of illustrative steps for determining whether a received authorization code permits access to a media asset, in accordance with some embodiments of the disclosure.

FIG. 10 is a flowchart of illustrative steps for determining whether a received authorization code permits access to a media asset, in accordance with some embodiments of the disclosure. For example, a media guidance application implementing process 1000 may be executed by control circuitry 704 (FIG. 7). It should be noted that process 1000 or any step thereof could be performed on, or provided by, any of the devices or equipment shown in FIGS. 7-8. Process 1000 starts with 1002, where the media guidance application begins a process for determining whether to allow access to a blocked media asset based on a received authorization code. For example, the media guidance application may execute (e.g., via control circuitry 704 (FIG. 7)) a program script initializing process 1000.

Process 1000 continues to 1004, where the media guidance application accesses (e.g., via control circuitry 704 (FIG. 7)) a parental control database. For example, the media guidance application may access the parental control database locally in storage 708 or remotely at a server (e.g., media guidance data source 818 accessible via communications network 814)). The parental control database may be designed in a self-referencing manner, where information about each user (e.g., defined by a first authorization code as discussed above with respect to FIGS. 1 and 9), blocking criteria, permissible functions, and whether certain functions require two-factor authentication may all be contained non-contiguously in a single table and linked via pointers to the appropriate fields in the table.

Process 1000 continues to 1006, where the media guidance application determines (e.g., via control circuitry 704 (FIG. 7)), based on comparing characters of the received authorization code with characters of a plurality of authorization codes stored in entries of the parental control database, whether the received authorization code matches a first stored authorization code. For example, the media guidance application may execute (e.g., via control circuitry 704 (FIG. 7)) a program script utilizing a for-loop to iterate through the plurality of authorization codes stored in the parental control database. For each authorization code, the media guidance application may retrieve (e.g., via control circuitry 704 (FIG. 7)) a value for the authorization code from a field and compare the retrieved authorization code to the received authorization code. As a specific example, the media guidance application may retrieve (e.g., via control circuitry 704 (FIG. 7)) the code "14578" from an entry in the database and compare each character to a received code "12345" by indexing and comparing the characters in the string of characters. In this particular example, the first index matches, since both first indexed characters are "1," but it fails at the second index because "4" is not the same character as "2." For this example, the media guidance application would determine (e.g., via control circuitry 704 (FIG. 7)) that the particular entry containing authorization code "14578" does not match the received code and would proceed to check the next stored authorization code. In some embodiments, once all authorization codes of the plurality of authorization codes have been checked, the program script executed by the media guidance application terminates and the media guidance application determines (e.g., via control circuitry 704 (FIG. 7)) whether a match was found. In some embodiments, the program script executed by the media guidance application terminates upon determining a match.

If the media guidance application does not determine a match at 1006, process 1000 continues to 1014 where the media guidance application does not allow access (e.g., via control circuitry 704 (FIG. 7)) to the blocked media asset. For example, if the media guidance application determines (e.g., via control circuitry 704 (FIG. 7)) that no stored authorization code matches the received authorization code, the media guidance application may determine that access should not be granted to the blocked media asset.

If the media guidance application does determine a match at 1006, process 1000 continues to 1008 where the media guidance application retrieves (e.g., via control circuitry 704 (FIG. 7)) a value from a field associated with the first stored authorization code. For example, as described above with respect to FIG. 2, a parental control database may contain blocking criteria associated with particular authorization codes, such as "TV-PG." The media guidance application may retrieve (e.g., via control circuitry 704 (FIG. 7)) a blocking criterion, or any other value from the entry for the matched authorization code, that can be used to determine whether access should be granted.

Process 1000 continues to 1010, where the media guidance application determines (e.g., via control circuitry 704 (FIG. 7)) whether the value corresponds to granting access to the blocked media asset. For example, the media guidance application may compare (e.g., via control circuitry 704 (FIG. 7)) the retrieved value from the parental control database with metadata associated with the requested media asset, as described above with respect to FIG. 2. For example, the media guidance application may retrieve (e.g., via control circuitry 704 (FIG. 7)), from a field of stored metadata associated with the media asset, the rating of the media asset. The media guidance application may then compare (e.g., via control circuitry 704 (FIG. 7)) the rating with a blocking criterion for ratings associated with the matched authorization code. For example, the rating stored in the parental control database may be "TV-PG" and the metadata associated with the media asset may indicate that it is "TV-MA." The media guidance application may determine (e.g., via control circuitry 704 (FIG. 7)) that since "TV-MA" exceeds "TV-PG" (i.e., it is a higher rating), the value does not correspond to granting access to the media asset. In some embodiments, ratings may be assigned integer values for easier comparison by the media guidance application. For example, TV-PG may be assigned "1" and TV-MA may be assigned "5."

If the media guidance application determines the value does not correspond to granting access to the blocked media asset at 1010, process 1000 continues to 1014, where the media guidance application does not allow access (e.g., via control circuitry 704 (FIG. 7)) to the blocked media asset, as described above. If the media guidance application determines the value does correspond to granting access to the blocked media asset at 1010, process 1000 continues to 1016, where the media guidance application allows access (e.g., via control circuitry 704 (FIG. 7)) to the blocked media asset. For example, based on the rating of the media asset being lower than the blocking criterion, the media guidance application may permit access to the media asset (e.g., allow the media asset to be generated for display).

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 7-8 could be used to perform one or more of the steps in FIG. 10.

Figure 11:
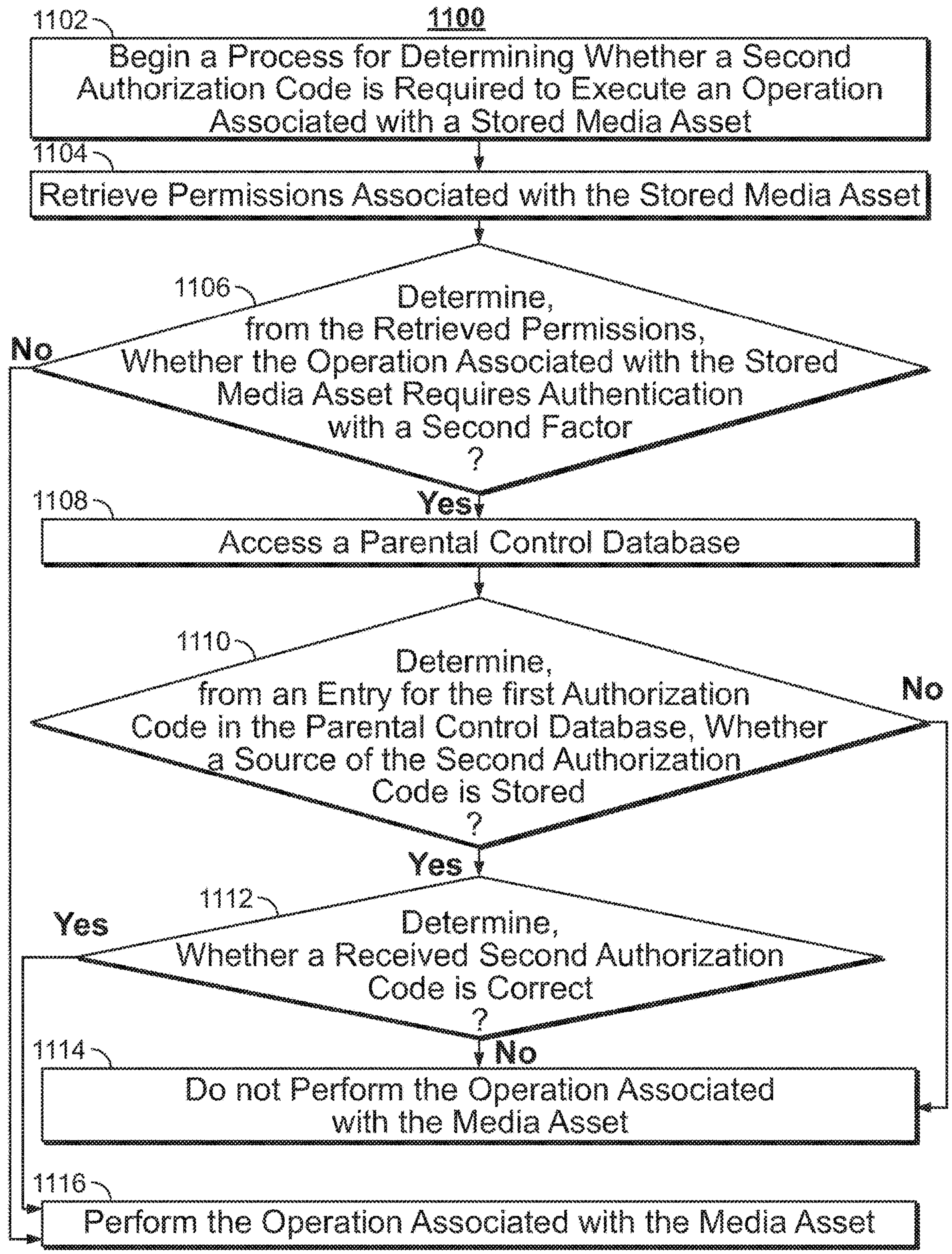
FIG. 11 is a flowchart of illustrative steps for determining whether a requested operation requires a second authorization code, in accordance with some embodiments of the disclosure.

FIG. 11 is a flowchart of illustrative steps for determining whether a requested operation requires a second authorization code, in accordance with some embodiments of the disclosure. For example, a media guidance application implementing process 1100 may be executed by control circuitry 704 (FIG. 7). It should be noted that process 1100 or any step thereof could be performed on, or provided by, any of the devices or equipment shown in FIGS. 7-8. Process 1100 starts with 1102, where the media guidance application begins a process for determining whether a second authorization code is required to execute an operation associated with a stored media asset. For example, the media guidance application may execute (e.g., via control circuitry 704 (FIG. 7)) a program script initializing process 1100.

Process 1100 continues to 1104, where the media guidance application retrieves (e.g., via control circuitry 704 (FIG. 7)) permissions associated with the stored media asset. For example, as described above with respect to FIG. 2, the media guidance application may store (e.g., via control circuitry 704 (FIG. 7)) an indication with metadata associated with a stored media asset whether or not a second factor is required to perform particular operations. For example, the media guidance application may store a boolean value set to "true" if a second-factor is required to perform a particular operation. The media guidance application may retrieve (e.g., via control circuitry 704 (FIG. 7)) this value from a field of the stored metadata. In some embodiments, the permissions may be stored in a separate database, which may be stored locally in storage 708 or remotely at a server (e.g., media guidance data source 818 accessible via communications network 814)), listing all stored media assets and permissions, instead of or in addition to with metadata associated with the stored media asset (e.g., in a header of a file containing audiovisual data for the stored media asset).

Process 1100 continues to 1106, where the media guidance application determines (e.g., via control circuitry 704 (FIG. 7)), from the retrieved permissions, whether the operation associated with the stored media asset requires authentication with a second factor. For example, the media guidance application may retrieve (e.g., via control circuitry 704 (FIG. 7)) a boolean value for a particular requested operation (e.g., delete) indicating whether a second authorization factor is required to perform the requested operation. In some embodiments, the retrieved permissions may be strings or other data types that can be parsed and analyzed by the media guidance application to determine whether another authorization factor is required. For example, the media guidance application may retrieve (e.g., via control circuitry 704 (FIG. 7)) the string, "Joe should not delete media assets without a second-factor," which may be stored based on a communication from another user. Based on analyzing the string, the media guidance application may determine (e.g., via control circuitry 704 (FIG. 7)) that the authorization code corresponding to Joe (e.g., "1234") requires another authorization factor in order to delete media assets.

If the media guidance application determines that the operation does not require authentication with a second factor at step 1106, process 1100 continues to 1116, where the media guidance application performs (e.g., via control circuitry 704 (FIG. 7)) the operation associated with the media asset. For example, as is described in detail below with respect to FIG. 12, the media guidance application may execute (e.g., via control circuitry 704 (FIG. 7)) the requested operation (e.g., to delete the media asset).

If the media guidance application determines that the operation does require authentication with a second factor at step 1106, process 1100 continues to 1108, where the media guidance application accesses (e.g., via control circuitry 704 (FIG. 7)) a parental control database. For example, as is described in FIG. 10 above, the media guidance application may access (e.g., via control circuitry 704 (FIG. 7)) the parental control database locally in storage 708 or remotely at a server (e.g., media guidance data source 818 accessible via communications network 814)).

Process 1100 continues to 1110, where the media guidance application determines (e.g., via control circuitry 704 (FIG. 7)), from an entry for the first authorization code in the parental control database, whether a source of the second authorization code is stored. For example, as described with respect to FIG. 2, the parental control database may contain a field containing an indication of a source of a second-factor. The source may be a token mechanism, biometric signature, or other second-factor that is complimentary to the first-factor (e.g., the first factor is a knowledge factor and the second is a possession factor). The media guidance application may retrieve (e.g., via control circuitry 704 (FIG. 7)) a string, such as "token" from the parental control database and execute a program script to retrieve the appropriate second authorization factor based on the retrieved string.

If the media guidance application determines a source of the second authorization code is not stored at 1110, process 1100 continues to 1114, where the media guidance application does not perform (e.g., via control circuitry 704 (FIG. 7)) the operation associated with the media asset. For example, the media guidance application may determine (e.g., via control circuitry 704 (FIG. 7)) that since no indication of the source of second authorization code is stored in the parental control database, the user is not entitled to perform the operation associated with the media asset, since they cannot be authenticated.

If the media guidance application determines a source of the second authorization code is stored at 1110, process 1100 continues to 1112, where the media guidance application determines (e.g., via control circuitry 704 (FIG. 7)) whether a received authorization code is correct. In some embodiments, the media guidance application may transmit (e.g., via control circuitry 704 (FIG. 7) a received second authorization code to a remote database (e.g., via communications network 814 (FIG. 8)) and receive an indication that the second authorization code is correct (e.g., a boolcan set to true extracted from a data packet received from the remote database). In other embodiments, the media guidance application may determine (e.g., via control circuitry 704 (FIG. 7) whether the received second authorization code is correct by comparing the received code to a plurality of codes stored in a database, as outlined above with respect to FIGS. 10 and 11.

If the media guidance application determines the received second authorization code is correct at 1112, process 1100 continues to 1116, where the media guidance application performs the operation associated with the media asset. For example, as is described in detail below with respect to FIG. 12, the media guidance application may execute (e.g., via control circuitry 704 (FIG. 7)) the requested operation (e.g., to delete the media asset). If the media guidance application determines the received second authorization code is not correct at 1112, process 1100 continues to 1114, where the media guidance application does not perform (e.g., via control circuitry 704 (FIG. 7)) the operation associated with the media asset. For example, the media guidance application may determine (e.g., via control circuitry 704 (FIG. 7)) that since an incorrect second authorization code was received, the operation should not be executed.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 7-8 could be used to perform one or more of the steps in FIG. 11.

Figure 12:
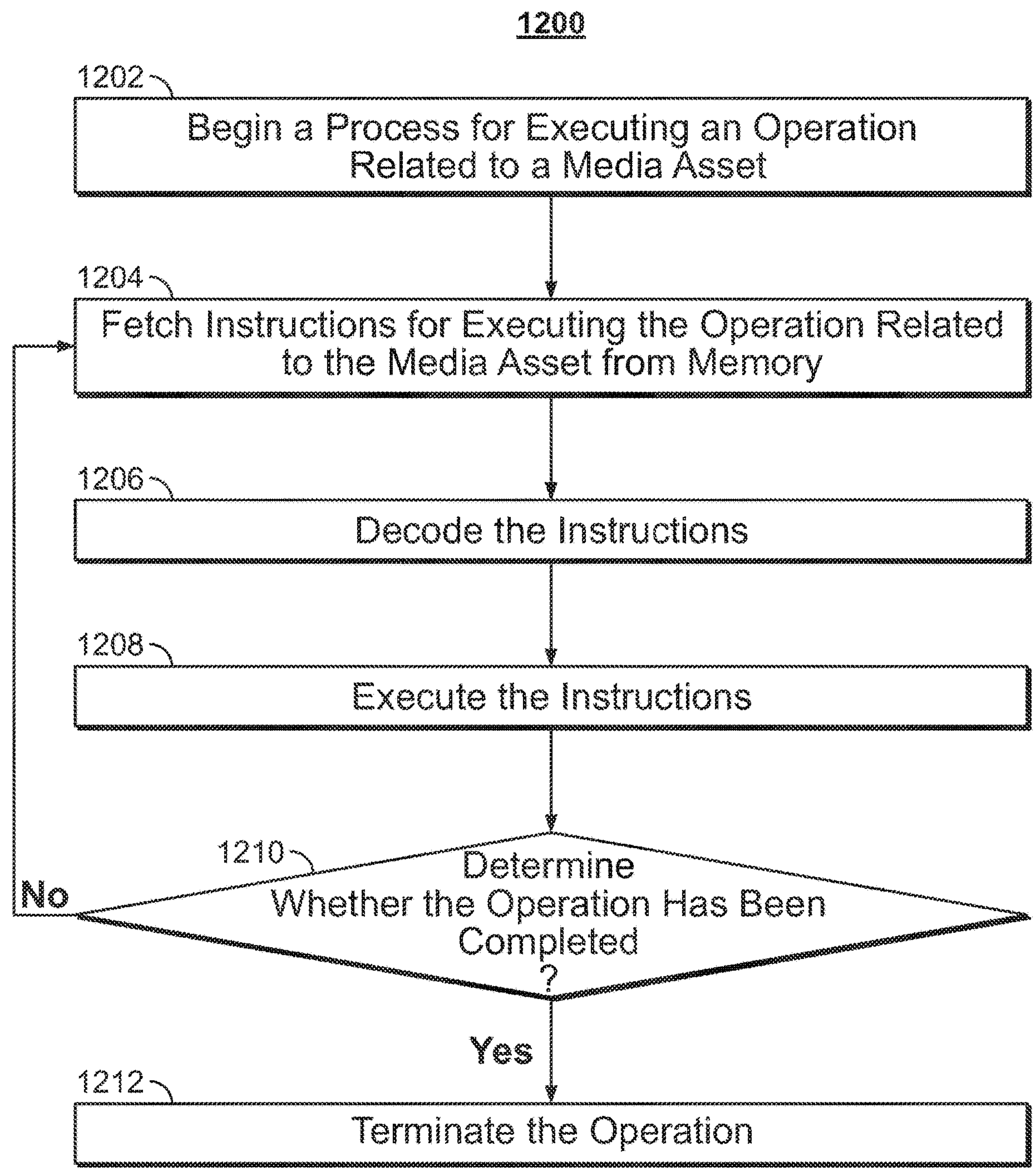
FIG. 12 is a flowchart of illustrative steps for performing an operation relating to a media asset, in accordance with some embodiments of the disclosure.

FIG. 12 is a flowchart of illustrative steps for performing an operation relating to a media asset, in accordance with some embodiments of the disclosure. For example, a media guidance application implementing process 1200 may be executed by control circuitry 704 (FIG. 7). It should be noted that process 1200 or any step thereof could be performed on, or provided by, any of the devices or equipment shown in FIGS. 7-8. Process 1200 starts with 1202, where the media guidance application begins a process for executing an operation related to a media asset. For example, the media guidance application may execute (e.g., via control circuitry 704 (FIG. 7)) a program script initializing process 1200.

Process 1200 continues to 1204, where the media guidance application fetches (e.g., via control circuitry 704 (FIG. 7)) instructions for executing the operation related to the media asset from memory. For example, the instructions could be an executable script such as a script in an object-oriented programming language (e.g., C++). The media guidance application may fetch (e.g., via control circuitry 704 (FIG. 7)) the script from the database containing the operation related to the media asset (e.g., any of the operations described above with respect to FIGS. 1-9).

Process 1200 continues to 1206, where the media guidance application decodes (e.g., via control circuitry 704 (FIG. 7)) the instructions. For example, if the instructions are in an object-oriented script in a language such as C++, control circuitry 1204 may compile (e.g., via control circuitry 704 (FIG. 7)) the code so that the code may be executed.

Process 1200 continues to 1208, where the media guidance application executes (e.g., via control circuitry 704 (FIG. 7)) the instructions. For example, the media guidance application may perform (e.g., via control circuitry 704 (FIG. 7)) operations based on the decoded instructions. For instance, the decoded instructions may instruct (e.g., via control circuitry 704 (FIG. 7)) the media guidance application to clear the contents of blocks of memory storing a media asset.

Process 1200 may continue to 1210, where the media guidance application determines (e.g., via control circuitry 704 (FIG. 7)) whether the operation has been completed. For example, the executed instructions may be to clear the contents of one specific block of memory, in which case after the block of memory has been cleared new instructions may need to be fetched to clear another block of memory (e.g., in order to clear all blocks of memory storing the media asset when deleting the media asset). If the media guidance application determines (e.g., via control circuitry 704 (FIG. 7)) that the operation has not been completed, process 1200 may return to 1204. For example, if the operation requires multiple loops through the script, the media guidance application may determine the operation has not been completed and returns to step 1204. If the media guidance application determines (e.g., via control circuitry 704 (FIG. 7)) the operation has been completed, then process 1200 continues to 1212 where the media guidance application terminates the operation.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 7-8 could be used to perform one or more of the steps in FIG. 12.

Figure 13:
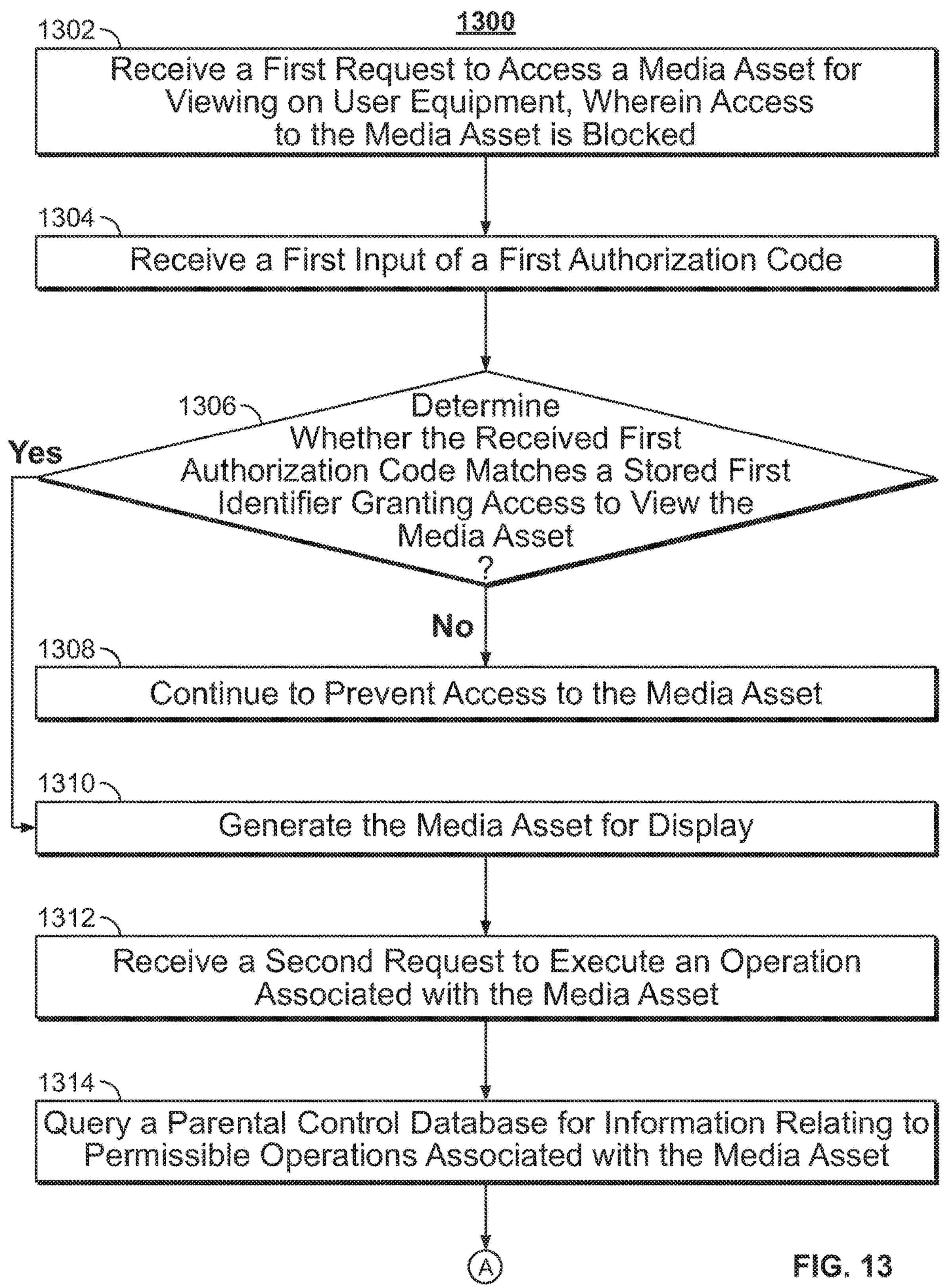
FIG. 13 is another flowchart of illustrative steps for authorizing operations associated with blocked media assets using two-factor authentication, in accordance with some embodiments of the disclosure.
Figure 13:
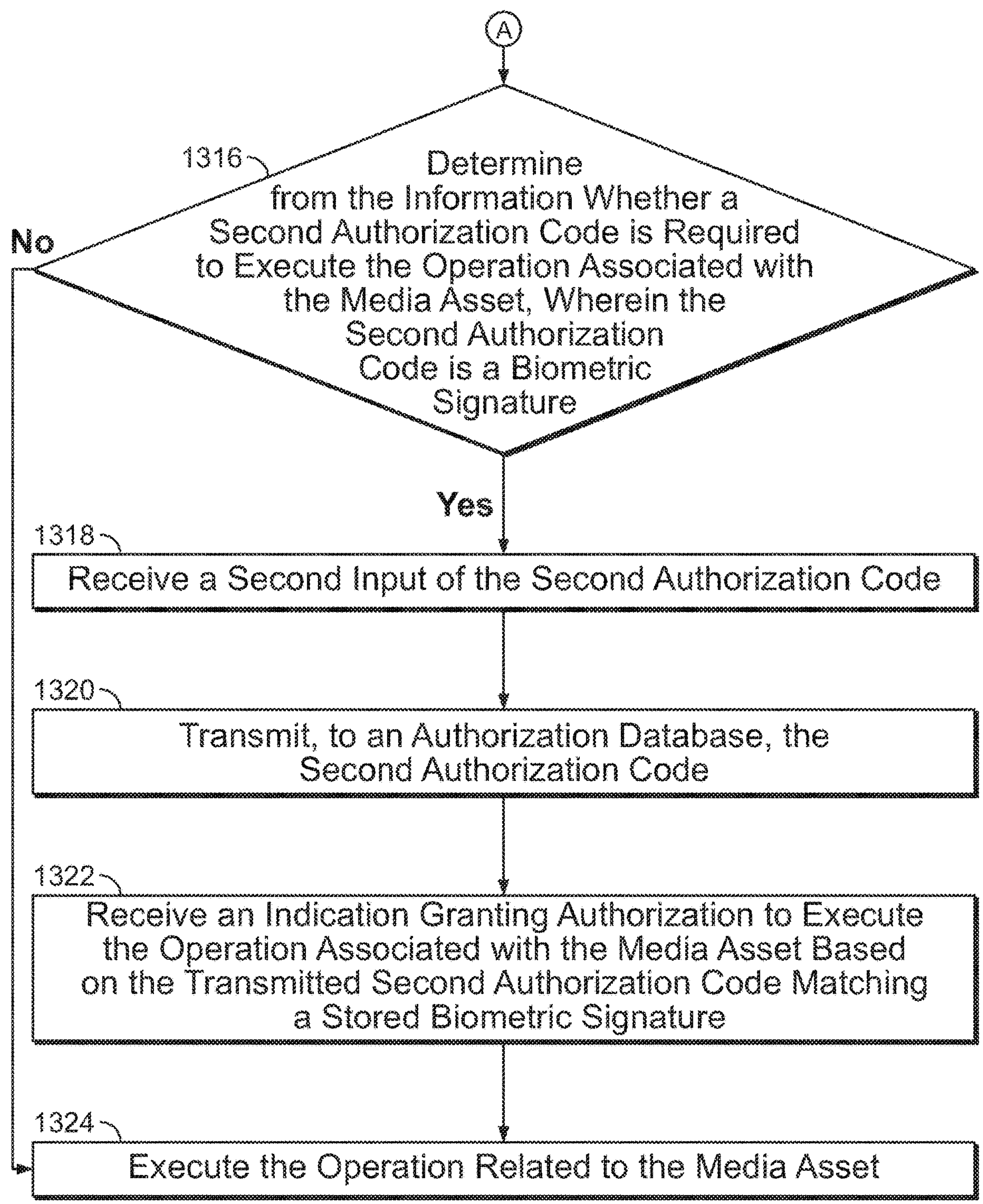

FIG. 13 is another flowchart of illustrative steps for authorizing operations associated with blocked media assets using two-factor authentication, in accordance with some embodiments of the disclosure. For example, a media guidance application implementing process 1300 may be executed by control circuitry 704 (FIG. 7). It should be noted that process 1300 or any step thereof could be performed on, or provided by, any of the devices or equipment shown in FIGS. 7-8.

Process 1300 begins at 1302, where the media guidance application receives (e.g., via control circuitry 704 (FIG. 7)) a first request to access a media asset for viewing on user equipment, wherein access to the media asset is blocked. For example, the media guidance application may store (e.g., via control circuitry 704 (FIG. 7)) a plurality of media assets in storage either local to the user device that generates media assets for display (e.g., storage 708) or remotely at a server (e.g., media guidance data source 818 accessible via communications network 814). The media guidance application may generate a listing of media assets (e.g., in a user interface on display 712) which the user can select for display. The media guidance application may set (e.g., via control circuitry 704 (FIG. 7)) a flag, based on metadata associated with each stored media asset, indicating whether each media asset should be blocked for a given user. As a specific example, the media guidance application may set (e.g., via control circuitry 704 (FIG. 7)) the flag based on metadata associated with the media asset indicating that it fulfills a predefined blocking criterion (e.g., that a particular user cannot watch shows with a rating greater than TV-PG).

Process 1300 continues to 1304, where the media guidance application receives (e.g., via control circuitry 704 (FIG. 7)) a first input of a first authorization code. The first authorization code may be any combination of alphanumeric characters that can be matched to a stored string of alphanumeric characters. The media guidance application may receive (e.g., via control circuitry 704 (FIG. 7)) the first identifier via user input using a user input interface (e.g., user input interface 710), such as a touchscreen or remote control. For example, the media guidance application may receive (e.g., via control circuitry 704 (FIG. 7)) the user input, "1578," via a remote control.

Process 1300 continues to 1306, where the media guidance application determines (e.g., via control circuitry 704 (FIG. 7)) whether the received first authorization code matches a stored first identifier (e.g., stored locally in storage 708 or remotely at a server (e.g., media guidance data source 818 accessible via communications network 814)) granting access to view the media asset. For example, the media guidance application determines (e.g., via control circuitry 704 (FIG. 7)) whether the received input, "1578," matches a value stored in memory for the first identifier. As a specific example, the media guidance application may access a parental control database (e.g., stored locally in storage 708 or remotely at a server (e.g., media guidance data source 818 accessible via communications network 814)), which contains a plurality of identifiers associated with permissions (i.e., whether each code can access the media asset). The media guidance application may compare (e.g., via control circuitry 704 (FIG. 7)) the received first authorization code with the stored identifiers to determine a match (e.g., by comparing the characters of the first authorization code with characters of each of the stored identifiers). After determining a match, the media guidance application retrieves (e.g., via control circuitry 704 (FIG. 7)) data from a field in the database corresponding to the matched identifier and determines whether the data indicates a user has access to the media asset.

If the media guidance application determines the received first authorization code does not match a stored first identifier granting access to view the media asset, process 1300 continues to 1308, where the media guidance application continues (e.g., via control circuitry 704 (FIG. 7)) to prevent access to the media asset. For example, the media guidance application may determine (e.g., via control circuitry 704 (FIG. 7)) that the received first authorization code does not match any identifiers stored in the parental control database, or that the particular user defined by the first authorization code does not have permission to access the media asset (e.g., via a blocking criterion as described above with respect to FIG. 2).

If the media guidance application determines the received first authorization code matches a stored first identifier granting access to view the media asset, process 1300 continues to 1310, where the media guidance application generates (e.g., via control circuitry 704 (FIG. 7)) the media asset for display. For example, the media guidance application may generate for display the media asset on a display (e.g., on display 712) connected to the user equipment (e.g., any of user equipment described above in FIGS. 7-8). Alternatively or additionally, the media guidance application may query (e.g., via control circuitry 704 (FIG. 7)) the parental control database for an indication whether the user identified by the first authorization code can view the media asset on a device not coupled to the user equipment storing the media asset (e.g., streamed to a mobile device, such as a cellular telephone).

Process 1300 continues to 1312, where the media guidance application receives (e.g., via control circuitry 704 (FIG. 7)) a second request to execute an operation associated with the media asset. The operation may be any command or instruction that when executed alters or copies the stored audiovisual data for the media asset or any stored metadata relating to the media asset. For example, the media guidance application may receive (e.g., via control circuitry 704 (FIG. 7)) a request via a user input interface (e.g., a touch screen) to delete the media asset. As another example, the media guidance application may receive (e.g., via control circuitry 704 (FIG. 7)) a request via a user input interface to copy the media asset to another device. As yet another example, the media guidance application may receive (e.g., via control circuitry 704 (FIG. 7)) a request to update a user profile (e.g., with the viewing progress or an indication that a user dislikes the media asset) associated with the first authorization code.

Process 1300 continues to 1314, where the media guidance application queries (e.g., via control circuitry 704 (FIG. 7)) a parental control database for information relating to permissible operations associated with the media asset. For example, the media guidance application may, in a field of the parental control database for the identifier that matches the first authorization code, store (e.g., via control circuitry 704 (FIG. 7)) a pointer to an array which lists media assets a user is granted to perform the operation on. The parental control database may contain multiple fields, each with a pointer to an array indicating media assets where a particular operation can be performed without a second authorization code (e.g., delete, modify, etc.). Alternatively or additionally, the media guidance application may store (e.g., via control circuitry 704 (FIG. 7)) an indication of which operations require a second authorization code (e.g., they are not permissible with only the first authorization code) with metadata stored with the media asset. For example, the media guidance application may store (e.g., via control circuitry 704 (FIG. 7)) the runtime, rating, original airdate and other metadata as a header in the stored audiovisual data for the media asset, and may additionally contain indications of which operations require a second authorization code.

Process 1300 continues to 1316, where the media guidance application determines (e.g., via control circuitry 704 (FIG. 7)) from the information whether a second authorization code is required to execute the operation associated with the media asset, wherein the second authorization code is a biometric signature. For example, based on retrieving the information from the parental control database as described above for the stored media asset, the media guidance application determines (e.g., via control circuitry 704 (FIG. 7)) whether a second factor is needed in order to execute the function. The biometric signature may be any feature associated with a user that can be used to differentiate and thus authenticate the user. In some embodiments, the biometric signature may be an iris scan. For example, the media guidance application may analyze (e.g., via control circuitry 704 (FIG. 7)) the unique color patterns on a user's iris and map them to mathematical structures to compare to stored iris scans in a database. In another embodiment, the biometric signature may be a retinal scan. For example, the media guidance application may analyze (e.g., via control circuitry 704 (FIG. 7)) the pattern of blood vessels on a user's retina to identify a user (e.g., by comparing with patterns stored in a database). In yet another embodiment, the biometric signature may be a facial scan. For example, the media guidance application may determine (e.g., via control circuitry 704 (FIG. 7)) critical points (e.g., features such as the corners of the mouth, centers of the eyes etc.) and proximity to other features of a scan of a user's face and compare these to stored critical points in a database. In still another embodiment, the biometric signature may be a fingerprint scan. For example, the media guidance application may analyze (e.g., via control circuitry 704 (FIG. 7)) the patterns of a user's fingerprint and compare with stored patterns in a database.

If the media guidance application determines a second authorization code is not required to execute the operation, process 1300 continues to 1324, where the media guidance application executes (e.g., via control circuitry 704 (FIG. 7)) the operation related to the media asset. For example, based on querying the parental control database and determining that an identifier of the media asset is stored in an array indicating a particular user (e.g., identified by the first authorization code) can perform the operation for those media assets, the media guidance application may execute (e.g., via control circuitry 704 (FIG. 7) the operation without further input (e.g., no second-factor is required). As a specific example, the media guidance application may execute (e.g., via control circuitry 704 (FIG. 7) a program script to clear the blocks of memory where a particular media asset is stored (e.g., delete the media asset), or any of the operations described above with respect to FIGS. 1-4.

If the media guidance application determines a second authorization code is required to execute the operation, process 1300 continues to 1318, where the media guidance application receives (e.g., via control circuitry 704 (FIG. 7)) a second input of the second authorization code. For example, the media guidance application may receive (e.g., via control circuitry 704 (FIG. 7)), via a user input interface (e.g., user input interface 710), the second authorization code. For example, the media guidance application may receive, from an integrated camera of a user equipment device (e.g., any of user equipment discussed above with respect to FIGS. 7-8), an image of the biometric signature (e.g., an iris scan, retinal scan, etc.).

Process 1300 continues to 1320, where the media guidance application transmits (e.g., via control circuitry 704 (FIG. 7)), to an authorization database, the second authorization code. For example, the media guidance application may transmit (e.g., via control circuitry 704 (FIG. 7)) the second authorization code (e.g., biometric signature) to a database (e.g., stored locally in storage 708 or remotely at a server (e.g., media guidance data source 818 accessible via communications network 814)). In some embodiments, the media guidance application may preprocess (e.g., via control circuitry 704 (FIG. 7)) the second authorization code. For example, the media guidance application may generate (e.g., via control circuitry 704 (FIG. 7)) a data packet containing the second authorization code and a data file containing analysis of the biometric signature (e.g., critical points based on pattern recognition of pixels in a received image) which is then transmitted to the authorization database.

Process 1300 continues to 1322, where the media guidance application receives (e.g., via control circuitry 704 (FIG. 7)) an indication granting authorization to execute the operation associated with the media asset based on the transmitted second authorization code matching a stored biometric signature. For example, the media guidance application may receive (e.g., via control circuitry 704 (FIG. 7)) a data packet from the authorization package with a boolean value set to "true" if the transmitted authorization code corresponds to a second identifier or "false" if it does not. The second identifier may be a stored table or other data structure defining critical points of a particular biometric signature. For example, the second identifier may be a table containing distances between various points on a user's face. As another example, the second identifier may be one or a series of mathematical (e.g., fractal dimensions) representations of a user's iris.

After receiving the indication, process 1300 continues to 1324, where the media guidance application executes (e.g., via control circuitry 704 (FIG. 7)) the operation related to the media asset, as described above. As a specific example, the media guidance application may execute (e.g., via control circuitry 704 (FIG. 7) a program script to clear the blocks of memory where a particular media asset is stored (e.g., delete the media asset), or any of the operations described above with respect to FIGS. 1-4.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 7-8 could be used to perform one or more of the steps in FIG. 13.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for authorizing operations associated with blocked media assets using two-factor authentication, the method comprising:

receiving a first request to access a media asset for viewing and a first input of a first authorization code, wherein access to the media asset is blocked;

based on determining that the received first authorization code matches a stored first identifier, granting access to the media asset;

subsequent to granting access to the media asset, receiving a second request to execute an operation related to the media asset and a second input of a second authorization code; and based on determining that the received second authorization code matches a stored second identifier, executing the operation related to the media asset.

2. The method of claim 1, further comprising:

based on receiving the second request:

querying for information relating to permissible operations related to the media asset;

determining from the information that a second authorization code is required to execute the operation related to the media asset;

transmitting, to an authorization database, the second authorization code; in response to transmitting, to the authorization database, the second authorization code, receiving an indication granting authorization to execute the operation related to the media asset based on the transmitted second authorization code matching a second identifier; and based on receiving the indication, executing the operation related to the media asset.

3. The method of claim 1, further comprising:

retrieving, from a field in a database including a plurality of entries with stored identifiers associated with users, the first stored identifier;

determining whether the first stored identifier matches the received first authorization code by comparing characters of the first stored identifier with characters of the received first authorization code; and in response to determining that the first stored identifier matches the received first authorization code:

retrieving a value from a field associated with the first stored identifier; and determining whether the user identified by the first stored identifier has access to the media asset based on the value.

4. The method of claim 1, further comprising:

generating an instruction to allow access to view the media asset for a predetermined period of time;

executing the instruction, wherein the instruction stores a temporary indication, in a field associated with the first stored identifier in a database, to allow access to view the media asset; in response to executing the instruction, monitoring an elapsed time; and in response to determining the elapsed time exceeds the predetermined period of time, deleting the temporary indication to allow access to view the media asset.

5. The method of claim 1, further comprising:

receiving a user input to schedule the media asset for storage;

in response to receiving the user input, generating for display a user interface with a plurality of selectable options for restricting access to a corresponding plurality of operations;

receiving a selection of a selectable option for restricting access to a corresponding operation; and in response to receiving the selection, storing, in a database, information that the operation requires the second authorization code.

6. The method of claim 2, further comprising:

in response to receiving an indication not granting authorization to execute the operation related to the media asset based on the transmitted second authorization code not matching the second identifier, querying to determine whether there is an alternate second authorization code to allow the operation; and in response to determining that there is the alternate second authorization code to allow the operation, generating for display an indication to input the alternate second authorization code.

7. The method of claim 1, further comprising:

accessing a user database including identifiers of users who have accessed the media asset;

retrieving, from a field in the user database associated with an identifier, contact information for a device associated with a user who has accessed the media asset; and transmitting, to the device based on the contact information, a notification to the user that the operation associated with the media asset has been received.

8. The method of claim 7, wherein the field is a first field, further comprising:

receiving, from the device, an indication to prevent the operation; and storing the indication in a second field of a database associated with the media asset, wherein the indication prevents the operation from being executed.

9. The method of claim 1, wherein executing the operation related to the media asset comprises:

accessing blocks of memory containing data corresponding to the media asset; and copying the data contained in the blocks of memory corresponding to the media asset to first user equipment.

10. The method of claim 9, further comprising:

in response to copying the data, storing, in a field associated with the media asset in a database, an indication that the media asset has been copied to the first user equipment;

receiving a third request to access the media asset on a second user equipment; and preventing access to the media asset on the second user equipment while the media asset is copied on the first user equipment.

11. A system for authorizing operations associated with blocked media assets using two-factor authentication, the system comprising:

memory configured to store instructions; and processing circuitry coupled to the memory and configured to execute the instructions stored on the memory, wherein the processing circuitry is configured to:

receive a first request to access a media asset for viewing and a first input of a first authorization code, wherein access to the media asset is blocked;

based on determining that the received first authorization code matches a stored first identifier, grant access to the media asset;

subsequent to granting access to the media asset, receive a second request to execute an operation related to the media asset and a second input of a second authorization code; and based on determining that the received second authorization code matches a stored second identifier, execute the operation related to the media asset.

12. The system of claim 11, wherein the processing circuitry is further configured to:

based on receiving the second request:

query for information relating to permissible operations related to the media asset;

determine from the information that a second authorization code is required to execute the operation related to the media asset;

transmit, to an authorization database, the second authorization code;

in response to transmitting, to the authorization database, the second authorization code, receive an indication granting authorization to execute the operation related to the media asset based on the transmitted second authorization code matching a second identifier; and based on receiving the indication, execute the operation related to the media asset.

13. The system of claim 11, wherein the processing circuitry is further configured to:

retrieve, from a field in a database including a plurality of entries with stored identifiers associated with users, the first stored identifier;

determine whether the first stored identifier matches the received first authorization code by comparing characters of the first stored identifier with characters of the received first authorization code; and in response to determining that the first stored identifier matches the received first authorization code:

retrieve a value from a field associated with the first stored identifier; and determine whether the user identified by the first stored identifier has access to the media asset based on the value.

14. The system of claim 11, wherein the processing circuitry is further configured to:

generate an instruction to allow access to view the media asset for a predetermined period of time;

execute the instruction, wherein the instruction stores a temporary indication, in a field associated with the first stored identifier in a database, to allow access to view the media asset;

in response to executing the instruction, monitor an elapsed time; and in response to determining the elapsed time exceeds the predetermined period of time, delete the temporary indication to allow access to view the media asset.

15. The system of claim 11, wherein the processing circuitry is further configured to:

receive a user input to schedule the media asset for storage;

in response to receiving the user input, generate for display a user interface with a plurality of selectable options for restricting access to a corresponding plurality of operations;

receive a selection of a selectable option for restricting access to a corresponding operation; and in response to receiving the selection, store, in a database, information that the operation requires the second authorization code.

16. The system of claim 12, wherein the processing circuitry is further configured to:

in response to receiving an indication not granting authorization to execute the operation associated with the media asset based on the transmitted second authorization code not matching the second identifier, query to determine whether there is an alternate second authorization code to allow the operation; and in response to determining that there is the alternate second authorization code to allow the operation, generate for display an indication to input the alternate second authorization code.

17. The system of claim 11, wherein the processing circuitry is further configured to:

access a user database including identifiers of users who have accessed the media asset; retrieve, from a field in the user database associated with an identifier, contact information for a device associated with a user who has accessed the media asset; and transmit, to the device based on the contact information, a notification to the user that the operation associated with the media asset has been received.

18. The system of claim 17, wherein the field is a first field, and wherein the processing circuitry is further configured to:

receive, from the device, an indication to prevent the operation; and store the indication in a second field of a database associated with the media asset, wherein the indication prevents the operation from being executed.

19. The system of claim 11, wherein the processing circuitry, when executing the operation related to the media asset, is configured to:

access blocks of memory containing data corresponding to the media asset; and copy the data contained in the blocks of memory corresponding to the media asset to first user equipment.

20. The system of claim 19, wherein the processing circuitry is further configured to:

in response to copying the data, store, in a field associated with the media asset in a database, an indication that the media asset has been copied to the first user equipment;

receive a third request to access the media asset on a second user equipment; and prevent access to the media asset on the second user equipment while the media asset is copied on the first user equipment.

* * * * *